US012748176B2

(12) United States Patent
Xu et al.

(10) Patent No.: US 12,748,176 B2
(45) Date of Patent: Sep. 29, 2026

(54) METHOD AND APPARATUS FOR DETECTING RELATIVE LOCATION BETWEEN DEVICES

(71) Applicant: Huawei Technologies Co., Ltd., Shenzhen (CN)

(72) Inventors: Qiang Xu, Toronto (CA); Chenhe Li, Toronto (CA); Yanshan He, Shenzhen (CN); Wenhao Wu, Shenzhen (CN); Shuai Wang, Xi'an (CN); Hongxing Peng, Xi'an (CN); Shiming Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 18/264,869

(22) PCT Filed: Jan. 24, 2022

(86) PCT No.: PCT/CN2022/073438
§ 371 (c)(1),
(2) Date: Aug. 9, 2023

(87) PCT Pub. No.: WO2022/170949
PCT Pub. Date: Aug. 18, 2022

(65) Prior Publication Data

US 2024/0094330 A1 Mar. 21, 2024

(30) Foreign Application Priority Data

Feb. 10, 2021 (CN) ......................... 202110186977.7

(51) Int. Cl.
*G01S 5/18* (2006.01)

(52) U.S. Cl.
CPC ...................................... *G01S 5/18* (2013.01)

(58) Field of Classification Search
CPC ........................................................ G01S 5/18
See application file for complete search history.

(56) References Cited

U.S. PATENT DOCUMENTS

2012/0127831 A1* 5/2012 Gicklhorn ............. G01S 3/8083 367/137
2018/0041853 A1 2/2018 Kadri et al.

FOREIGN PATENT DOCUMENTS

CN 104298342 A 1/2015
CN 112181343 A 1/2021
WO WO-2012027644 A2 * 3/2012 ............... G06N 5/02

* cited by examiner

*Primary Examiner* — Abdallah Abulaban
(74) *Attorney, Agent, or Firm* — Slater Matsil, LLP

(57) ABSTRACT

A method and an apparatus for detecting a relative location between devices is disclosed. The detection method includes: obtaining a first target audio signal obtained by a first microphone of a device B; determining a first audio segment and a second audio segment based on a first target moment and the first target audio signal, where the first target moment is a moment determined in the first target audio signal based on a target amplitude; separately searching for the first audio segment and the second audio segment to obtain a first arrival moment and a second arrival moment; and determining a relative location between a device A and the device B based on the first arrival moment and the second arrival moment.

19 Claims, 13 Drawing Sheets

METHOD AND APPARATUS FOR DETECTING RELATIVE LOCATION BETWEEN DEVICES

CROSS-REFERENCE TO RELATED APPLICATIONS

This application is a national stage of International Application No. PCT/CN2022/073438, filed on Jan. 24, 2022, which claims priority to Chinese Patent Application No. 202110186977.7, filed on Feb. 10, 2021, which are incorporated herein by reference in their entireties.

TECHNICAL FIELD

This application relates to the field of positioning, and in particular, to a method and an apparatus for detecting a relative location between devices.

BACKGROUND

Spatial interaction is a human-computer interaction technology and method based on spatial location (including relative locations and angles, absolute locations and angles, and the like between people and a device and between devices) perception. To implement better user experience, spatial perception needs to be implemented between a plurality of devices of a user. For example, Apple uses an ultra-wideband (ultra-wideband, UWB) technology to implement an AirDrop directional sharing function. For example, Wi-Fi and Bluetooth are used for proximity detection between devices.

In a solution, a plurality of ultrasonic positioning modules are used to send ultrasonic signals. The ultrasonic signals are reflected by a hand of the user. Reflected signals are filtered by a control and processing module, and then output to a host computer, to generate information such as a posture and a location of the hand of the user. However, a relative location between devices cannot be determined only by reflection.

SUMMARY

Embodiments of this application provide a method and an apparatus for detecting a relative location between devices. According to embodiments of this application, the relative location between the devices can be determined with low costs and high precision without additional hardware.

According to a first aspect, an embodiment of this application provides a method for detecting a relative location between devices, including:

obtaining a first target audio signal obtained by a first microphone of a device B, where the first target audio signal is obtained based on a first audio signal emitted by a first speaker of a device A and a second audio signal emitted by a second speaker of the device A; determining a first audio segment and a second audio segment based on a first target moment and the first target audio signal, where the first target moment is a moment determined in the first target audio signal based on a target amplitude, the first audio segment is a segment that is in the first target audio signal and that is related to the first audio signal, and the second audio segment is a segment that is in the first target audio signal and that is related to the second audio signal; separately searching for the first audio segment and the second audio segment to obtain a first arrival moment and a second arrival moment, where the first arrival moment is a moment corresponding to a first target wave peak, the second arrival moment is a moment corresponding to a second target wave peak, the first target wave peak is a wave peak with earliest receiving time in wave peaks whose signal amplitudes are greater than a first preset amplitude in the first audio segment, and the second target wave peak is a wave peak with earliest receiving time in wave peaks whose signal amplitudes are greater than a second preset amplitude in the second audio segment; and determining a relative location between the device A and the device B based on the first arrival moment and the second arrival moment.

In the first target audio signal, a time range corresponding to the first audio segment does not overlap a time range corresponding to the second audio segment.

Optionally, a time period within which the first speaker of the device A emits the first audio signal may overlap or may not overlap a time period within which the second speaker of the device A emits the second audio signal. The first preset amplitude and the second preset amplitude may be the same, or may be different.

Optionally, that the first target moment is a moment determined in the first target audio signal based on a target amplitude specifically includes: The first target moment is a moment corresponding to a maximum signal amplitude in the first target audio signal; or there are a plurality of wave peaks whose signal amplitudes exceed a target amplitude in the first target audio signal, and the first target moment is a moment corresponding to a wave peak with earliest receiving time in these wave peaks. Optionally, the target wave peak may alternatively be an average value, a maximum value, or another value of a plurality of wave peaks in the first audio signal.

The relative location between the device A and the device B is determined based on the audio signals that are emitted by the first speaker and the second speaker of the device A and that are captured by the first microphone of the device B, so that the relative location between the devices is determined without additional hardware. The audio signals generated by the first speaker and the second speaker of the device A are searched for, to obtain the first arrival moment and the second arrival moment, and the relative location between the device A and the device B is determined based on the first arrival moment and the second arrival moment. This avoids multipath interference of the audio signals in a spatial transmission process, and further improves precision of the relative location between the devices.

In a feasible embodiment, the determining a first audio segment and a second audio segment based on a first target moment and the first target audio signal includes:

determining the first audio segment from the first target audio signal based on the first target moment, a distance between the first speaker and the second speaker of the device A, and a sampling frequency of the first microphone of the device B; and determining the second audio segment from the first target audio signal based on the first target moment, the distance between the first speaker and the second speaker of the device A, the sampling frequency of the first microphone of the device B, and a time interval between a moment at which the first speaker of the device A generates the first audio signal and a moment at which the second speaker of the device A generates the second audio signal.

The first audio segment and the second audio segment are determined from the first target audio signal based on the moment (namely, the first target moment) corresponding to the maximum signal amplitude in the first target audio signal, a distance between two speakers of the device A, and the sampling frequency of the first microphone of the device B. This provides convenience for subsequently determining the first arrival moment and the second arrival moment, avoids multipath interference of the audio signals in a spatial transmission process, and further improves precision of the relative location between the devices.

In a feasible embodiment, the determining the first audio segment from the first target audio signal based on the first target moment, a distance between the first speaker and the second speaker of the device A, and a sampling frequency of the first microphone of the device B includes:

determining a first time range based on the first target moment, the distance between the first speaker and the second speaker of the device A, and the sampling frequency of the first microphone of the device B, where a start moment of the first time range is ind_max−2×(d/v)×f, an end moment of the first time range is ind_max+2×(D/v)×f, ind_max is the first target moment, d is a first preset distance, D is the distance between the first speaker and the second speaker of the device A, v is a sound velocity, and f is the sampling frequency of the first microphone of the device B; and determining the first audio segment from the first target audio signal based on the first time range, where the first audio segment is an audio segment corresponding to the first time range in the first target audio signal.

Optionally, the first preset distance may be a preset value, and may be preset based on an application scenario. For example, in an open area, the preset distance is 10 m, and in a scene of a room, the preset distance is 5 m. Certainly, the preset distance is determined based on a product of a preset time period and the sound velocity.

In a feasible embodiment, the determining the second audio segment from the first target audio signal based on the first target moment, the distance between the first speaker and the second speaker, the sampling frequency of the first microphone, and a time interval between a moment at which the first speaker generates the first audio signal and a moment at which the second speaker generates the second audio signal includes:

determining a second time range based on the first target moment, the distance between the first speaker and the second speaker, the sampling frequency of the first microphone, and the time interval, where a start moment of the second time range is ind_max−2×(d/v)×f−$T_1$, an end moment of the second time range is ind_max+2×(D/v)×f−$T_1$, ind_max is the first target moment, d is the first preset distance, D is the distance between the first speaker and the second speaker, v is the sound velocity, f is the sampling frequency of the first microphone, and $T_1$ is the time interval; and determining the second audio segment from the first target audio signal based on the second time range, where the second audio segment is an audio segment corresponding to the second time range in the second target audio signal.

In a feasible embodiment, the determining the second audio segment from the first target audio signal based on the first target moment, the distance between the first speaker and the second speaker of the device A, the sampling frequency of the first microphone of the device B, and a time interval between a moment at which the first speaker of the device A generates the first audio signal and a moment at which the second speaker of the device A generates the second audio signal includes:

determining a third time range and a fourth time range based on the first target moment, the distance between the first speaker and the second speaker of the device A, the sampling frequency of the first microphone of the device B, and the time interval, where a start moment of the third time range is ind_max−2×(d/v)×f+$T_1$, an end moment of the third time range is ind_max+$T_1$+2×(D/v)×f, a start moment of the fourth time range is ind_max−2×(d/v)×f−$T_1$, an end moment of the fourth time range is ind_max−$T_1$+2×(D/v)×f, ind_max is the first target moment, d is the first preset distance, D is the distance between the first speaker and the second speaker of the device A, v is the sound velocity, f is the sampling frequency of the first microphone of the device B, and $T_1$ is the time interval; and determining the second audio segment from a third audio segment and a fourth audio segment, where the second audio segment is an audio segment in which a ratio of a maximum signal amplitude to an LOS signal amplitude falls within a preset range in the third audio segment and the fourth audio segment, the third audio segment is an audio segment corresponding to the third time range in the first target audio signal, and the fourth audio segment is an audio segment corresponding to the fourth time range in the first target audio signal.

The start moment and the end moment of the first time range are determined based on information such as the first target moment, to determine the first audio segment from the first target audio signal based on the first time range; and the third audio segment and the fourth audio segment are first determined based on the information such as the first target moment, and then the second audio segment is determined from the third audio segment and the fourth audio segment. This provides convenience for subsequently determining the first arrival moment and the second arrival moment, avoids multipath interference of the audio signals in a spatial transmission process, and further improves precision of the relative location between the devices.

In a feasible embodiment, the first target audio signal includes a third audio signal and a fourth audio signal, the third audio signal is the first audio signal that is emitted by the first speaker of the device A and that is received by the first microphone of the device B, and the fourth audio signal is the second audio signal that is emitted by the second speaker of the device A and that is received by the first microphone of the device B. The determining a first audio segment and a second audio segment based on a first target moment and the first target audio signal includes:

determining a fifth time range based on the first target moment and a preset time threshold, and determining a sixth time range based on a second target moment and the preset time threshold, where the first target moment is a moment determined in the third audio signal based on the target amplitude, the second target moment is a moment determined in the fourth audio signal based on the target amplitude, an end moment of the fifth time range is the first target moment, an end moment of the sixth time range is the second target moment, and both duration of the fifth time range and duration of the sixth time range are the preset time threshold; and obtaining the first audio segment from the third audio signal based on the fifth time range, and obtaining the second audio segment from the fourth audio signal based on the sixth time range, where the first audio segment is an audio signal segment corresponding to the fifth time range in the third audio signal, and the second audio segment is an audio signal segment corresponding to the sixth time range in the fourth audio signal.

A start moment and the end moment of the fifth time range are determined based on the first target moment, and a start moment and the end moment of the sixth time range are determined based on the second target moment, to determine the fifth time range and the sixth time range; and then the first audio segment and the second audio segment are respectively determined from the third audio signal and the fourth audio signal based on the fifth time range and the sixth time range. This provides convenience for subsequently determining the first arrival moment and the second arrival moment, avoids multipath interference of the audio signals in a spatial transmission process, and further improves precision of the relative location between the devices.

In a feasible embodiment, the preset time threshold is determined based on a first preset distance and a time interval between a moment at which the first speaker of the device A generates the first audio signal and a moment at which the second speaker of the device A generates the second audio signal.

In a feasible embodiment, the determining a relative location between the device A and the device B based on the first arrival moment and the second arrival moment includes:

building a first hyperbolic function based on the first arrival moment and the second arrival moment; and determining the relative location between the device A and the device B based on the first hyperbolic function and the distance between the first speaker and the second speaker.

In a feasible embodiment, the method in this application further includes:

obtaining a third arrival moment and a fourth arrival moment, where the third arrival moment and the fourth arrival moment are respectively a moment corresponding to a third target wave peak and a moment corresponding to a fourth target wave peak, the third target wave peak is a wave peak with earliest receiving time in wave peaks whose signal amplitudes are greater than a third preset amplitude in a fifth audio segment, the fourth target wave peak is a wave peak with earliest receiving time in wave peaks whose signal amplitudes are greater than a fourth preset amplitude in a sixth audio segment, the fifth audio segment is a segment that is in a second target audio signal and that is related to the first audio signal, the sixth audio segment is a segment that is in the second target audio signal and that is related to the second audio signal, and the second target audio signal is obtained by a second microphone of the device B based on the first audio signal emitted by the first speaker of the device A and the second audio signal emitted by the second speaker of the device A.

The determining a relative location between the device A and the device B based on the first arrival moment and the second arrival moment includes:

determining the relative location between the device A and the device B based on the first arrival moment, the second arrival moment, the third arrival moment, the fourth arrival moment, the distance between the first speaker and the second speaker, and a distance between the first microphone and the second microphone.

Optionally, the third preset amplitude and the fourth preset amplitude may be the same, or may be different.

It should be noted that, for a manner of determining the third arrival moment and the fourth arrival moment, refer to a manner of determining the first arrival moment and the second arrival moment. The second microphone of the device B is introduced, so that precision of the relative location between the devices is improved.

In a feasible embodiment, the first microphone of the device B meets the following condition:

Condition 1: a microphone that is in a plurality of microphones of the device B and that has a maximum difference between a distance from the first speaker and a distance from the second speaker, where the difference is greater than a second preset distance; or Condition 2: a microphone that is in a plurality of microphones of the device B and that is least blocked by the device B relative to the first speaker and the second speaker.

It should be noted herein that there are microphones that meet Condition 1 and Condition 2 in the device B, and a microphone that meets a condition with a higher priority is selected as the first microphone of the device B based on priorities of conditions. Optionally, a priority of Condition 1 is higher than or lower than a priority of Condition 2.

In a feasible embodiment, the first microphone and the second microphone of the device B meet the following condition:

Condition 3: two microphones that are farthest from each other in a plurality of microphones of the device B;

Condition 4: two microphones that are in a plurality of microphones of the device B and that each has a difference, greater than the second preset distance, between a distance from the first speaker and a distance from the second speaker; or Condition 5: two microphones that are in a plurality of microphones of the device B and that are least blocked by the device B relative to the first speaker and the second speaker of the device A.

It should be noted herein that, when there are a plurality of pairs of microphones (each pair of microphones includes two microphones) that meet Condition 3, Condition 4, and Condition 5 in the device B, a pair of microphones that meets a condition with a higher priority may be selected as the first microphone and the second microphone of the device B based on priorities of Condition 3, Condition 4, and Condition 5.

Optionally, a priority of Condition 3 is higher than a priority of Condition 4, and the priority of Condition 4 is higher than a priority of Condition 5. Alternatively, a priority of Condition 5 is higher than a priority of Condition 4, and the priority of Condition 4 is higher than a priority of Condition 3. Alternatively, a priority of Condition 4 is higher than a priority of Condition 5, and the priority of Condition 5 is higher than a priority of Condition 3. It should be understood that this is merely an example, and does not constitute a limitation on this application. Certainly, the priorities of Condition 3, Condition 4, and Condition 5 may alternatively be in another form.

A proper microphone is selected in the foregoing manner to receive the audio signals from the first speaker and the second speaker of the device A. This can reduce power consumption of the device A and the device B, and also improve precision of the relative location between the devices.

In a feasible embodiment, the device A is a projection device, and the device B is a projected device. After the determining a relative location between the device A and the device B based on the first arrival moment and the second arrival moment, the method in this application further includes:

displaying, in a preset area on a display interface of the device B, content displayed on a display interface of the device A, where a location of the preset area on the display interface of the device B is the same as a location of the device A relative to the device B.

The relative location between the device A and the device B is determined, so that during multi-screen collaborative work, the device B may display the content of the device A at a corresponding location on the display interface of the device B based on the relative location between the device A and the device B. For example, the device A is located on the right of the device B, and the device B displays, in a right area on the display interface, the content displayed on the display interface of the device A. This improves projection experience of a user.

According to a second aspect, an embodiment of this application provides a detection device, including: an obtaining unit, a determining unit, and a searching unit.

The obtaining unit is configured to obtain a first target audio signal obtained by a first microphone of a device B, where the first target audio signal is obtained based on a first audio signal emitted by a first speaker of a device A and a second audio signal emitted by a second speaker of the device A.

The determining unit is configured to determine a first audio segment and a second audio segment based on a first target moment and the first target audio signal, where the first target moment is a moment determined in the first target audio signal based on a target amplitude, the first audio segment is a segment that is in the first target audio signal and that is related to the first audio signal, the second audio segment is a segment that is in the first target audio signal and that is related to the second audio signal, and in the first target audio signal, a time range corresponding to the first audio segment does not overlap a time range corresponding to the second audio segment.

The searching unit is configured to separately search for the first audio segment and the second audio segment to obtain a first arrival moment and a second arrival moment, where the first arrival moment is a moment corresponding to a first target wave peak, the second arrival moment is a moment corresponding to a second target wave peak, the first target wave peak is a wave peak with earliest receiving time in wave peaks whose signal amplitudes are greater than a first preset amplitude in the first audio segment, and the second target wave peak is a wave peak with earliest receiving time in wave peaks whose signal amplitudes are greater than a second preset amplitude in the second audio segment.

The determining unit is further configured to determine a relative location between the device A and the device B based on the first arrival moment and the second arrival moment.

In a feasible embodiment, the determining unit is specifically configured to:

determine the first audio segment from the first target audio signal based on the first target moment, a distance between the first speaker and the second speaker of the device A, and a sampling frequency of the first microphone of the device B; and determine the second audio segment from the first target audio signal based on the first target moment, the distance between the first speaker and the second speaker of the device A, the sampling frequency of the first microphone of the device B, and a time interval between a moment at which the first speaker of the device A generates the first audio signal and a moment at which the second speaker of the device B generates the second audio signal.

In a feasible embodiment, in an aspect of determining the first audio segment from the first target audio signal based on the first target moment, the distance between the first speaker and the second speaker of the device A, and the sampling frequency of the first microphone of the device B, the determining unit is specifically configured to:

determine a first time range based on the first target moment, the distance between the first speaker and the second speaker of the device A, and the sampling frequency of the first microphone of the device B, where a start moment of the first time range is $ind\_max-2\times(d/v)\times f$, an end moment of the first time range is $ind\_max+2\times(D/v)\times f$, ind_max is the first target moment, d is a first preset distance, D is the distance between the first speaker and the second speaker of the device A, v is a sound velocity, and f is the sampling frequency of the first microphone of the device B; and determine the first audio segment from the first target audio signal based on the first time range, where the first audio segment is an audio segment corresponding to the first time range in the first target audio signal.

In a feasible embodiment, in an aspect of determining the second audio segment from the first target audio signal based on the first target moment, the distance between the first speaker and the second speaker, the sampling frequency of the first microphone, and the time interval between the moment at which the first speaker generates the first audio signal and the moment at which the second speaker generates the second audio signal, the determining unit is specifically configured to:

determine a second time range based on the first target moment, the distance between the first speaker and the second speaker, the sampling frequency of the first microphone, and the time interval, where a start moment of the second time range is $ind\_max-2\times(d/v)\times f-T_1$, an end moment of the second time range is $ind\_max+2\times(D/v)\times f-T_1$, ind_max is the first target moment, d is the first preset distance, D is the distance between the first speaker and the second speaker, v is the sound velocity, f is the sampling frequency of the first microphone of the device B, and $T_1$ is the time interval; and determine the second audio segment from the first target audio signal based on the second time range, where the second audio segment is an audio segment corresponding to the second time range in the second target audio signal.

In a feasible embodiment, in an aspect of determining the second audio segment from the first target audio signal based on the first target moment, the distance between the first speaker and the second speaker of the device A, the sampling frequency of the first microphone of the device B, and the time interval between the moment at which the first speaker of the device A generates the audio signal and the moment at which the second speaker of the device A generates the audio signal, the determining unit is specifically configured to:

determine a third time range and a fourth time range based on the first target moment, the distance between the first speaker and the second speaker of the device A, the sampling frequency of the first microphone of the device B, and the time interval between the moment at which the first speaker of the device A generates the first audio signal and the moment at which the second speaker of the device B generates the second audio signal, where a start moment of the third time range is $ind\_max-2\times(d/v)\times f+T_1$, an end moment of the third time range is $ind\_max+T_1+2\times(D/v)\times f$, a start moment of the fourth time range is $ind\_max-2\times(d/v)\times f-T_1$, an end moment of the fourth time range is $ind\_max-T_1+2\times(D/v)\times f$, ind_max is the first target moment, d is the first preset distance, D is the distance between the first speaker and the second speaker of the device A, v is the sound velocity, f is the sampling frequency of the first microphone of the device B, and $T_1$ is the time interval; and determine the second audio segment from a third audio segment and a fourth audio segment, where the second audio segment is an audio segment in which a ratio of a maximum signal amplitude to an LOS signal amplitude falls within a preset range in the third audio segment and the fourth audio segment, the third audio segment is an audio segment corresponding to the third time range in the first target audio signal, and the fourth audio segment is an audio segment corresponding to the fourth time range in the first target audio signal.

In a feasible embodiment, the first target audio signal includes a third audio signal and a fourth audio signal, the third audio signal is the first audio signal that is emitted by the first speaker of the device A and that is received by the first microphone of the device B, and the fourth audio signal is the second audio signal that is emitted by the second speaker of the device A and that is received by the first microphone of the device B. In an aspect of determining the first audio segment and the second audio segment based on the first target moment and the first target audio signal, the determining unit is specifically configured to:

determine a fifth time range based on the first target moment and a preset time threshold, and determine a sixth time range based on a second target moment and the preset time threshold, where the first target moment is a moment corresponding to the target amplitude in the third audio signal, the second target moment is a moment corresponding to the target amplitude in the fourth audio signal, an end moment of the fifth time range is the first target moment, an end moment of the sixth time range is the second target moment, and both duration of the fifth time range and duration of the sixth time range are the preset time threshold; and obtain the first audio segment from the third audio signal based on the fifth time range, and obtain the second audio segment from the fourth audio signal based on the sixth time range, where the first audio segment is an audio signal segment corresponding to the fifth time range in the third audio signal, and the second audio segment is an audio signal segment corresponding to the sixth time range in the fourth audio signal.

In a feasible embodiment, the preset time threshold is determined based on a first preset distance and a time interval between a moment at which the first speaker of the device A generates the first audio signal and a moment at which the second speaker of the device A generates the second audio signal.

In a feasible embodiment, in an aspect of determining the relative location between the device A and the device B based on the first arrival moment and the second arrival moment, the determining unit is specifically configured to:

build a first hyperbolic function based on the first arrival moment and the second arrival moment; and determine the relative location between the device A and the device B based on the first hyperbolic function and the distance between the first speaker and the second speaker of the device A.

In a feasible embodiment, the detection device further includes:

an obtaining unit, configured to: obtain a third arrival moment and a fourth arrival moment, where the third arrival moment is a moment corresponding to a third target wave peak, the fourth arrival moment is a moment corresponding to a fourth target wave peak, the third target wave peak is a wave peak with earliest receiving time in wave peaks whose signal amplitudes are greater than a third preset amplitude in a fifth audio segment, the fourth target wave peak is a wave peak with earliest receiving time in wave peaks whose signal amplitudes are greater than a fourth preset amplitude in a sixth audio segment, the fifth audio segment is a segment that is in a second target audio signal and that is related to the first audio signal, the sixth audio segment is a segment that is in the second target audio signal and that is related to the second audio signal, and the second target audio signal is obtained by a second microphone of the device B based on the first audio signal generated by the first speaker of the device A and the second audio signal generated by the second speaker of the device A.

In an aspect of determining the relative location between the device A and the device B based on the first arrival moment and the second arrival moment, the determining unit is specifically configured to:

determine the relative location between the device A and the device B based on the first arrival moment, the second arrival moment, the third arrival moment, the fourth arrival moment, the distance between the first speaker and the second speaker of the device A, and a distance between the first microphone and the second microphone.

In a feasible embodiment, the first microphone of the device B is:

a microphone that is in a plurality of microphones of the device B and that has a maximum difference between a distance from the first speaker and a distance from the second speaker, where the difference is greater than a preset distance; or a microphone that is in a plurality of microphones of the device B and that is least blocked by the device B relative to the first speaker and the second speaker.

In a feasible embodiment, the first microphone and the second microphone of the device B include:

two microphones that are farthest from each other in a plurality of microphones of the device B; two microphones that are in a plurality of microphones of the device B and that each has a difference, greater than the preset distance, between a distance from the first speaker and a distance from the second speaker; or two microphones that are in a plurality of microphones of the device B and that are least blocked by the device B relative to the first speaker and the second speaker of the device A.

In a feasible embodiment, the device A is a projection device, the device B is a projected device, and the detection apparatus further includes:

a control unit, configured to: after the relative location between the device A and the device B is determined based on the first arrival moment and the second arrival moment, display, in a preset area on a display interface of the device B, content displayed on a display interface of the device A, where a location of the preset area on the display interface of the device B is the same as a location of the device A relative to the device B.

According to a third aspect, an embodiment of this application provides a detection apparatus, including:

a memory, configured to store instructions; and a processor coupled to the memory, where when executing the instructions, the processor performs a part or all of the method in the first aspect.

According to a fourth aspect, an embodiment of this application provides a chip system. The chip system is applied to an electronic device. The chip system includes one or more interface circuits and one or more processors. The interface circuit and the processor are interconnected through a line. The interface circuit is configured to: receive a signal from a memory of the electronic device, and send the signal to the processor. The signal includes computer instructions stored in the memory. When the processor executes the computer instructions, the electronic device performs a part or all of the method in the first aspect.

According to a fifth aspect, an embodiment of this application provides a computer-readable storage medium. The computer storage medium stores a computer program, the computer program includes program instructions, and when the program instructions are executed by a processor, the processor is enabled to perform a part or all of the method in the first aspect.

According to a sixth aspect, an embodiment of this application provides a computer program product, including computer instructions. When the computer instructions are run on a recommendation apparatus, the recommendation apparatus is enabled to perform a part or all of the method in the first aspect.

These aspects or other aspects in this application are more concise and comprehensible in descriptions of the following embodiments.

BRIEF DESCRIPTION OF THE DRAWINGS

To describe the technical solutions in embodiments of the present invention or in the conventional technology more clearly, the following briefly describes the accompanying drawings for describing embodiments or the conventional technology. It is clear that the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Details are separately described below.

In the specification, claims, and accompanying drawings of this application, the terms "first", "second", "third", "fourth", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

An "embodiment" mentioned in this specification means that a specific feature, structure, or characteristic described with reference to an embodiment may be included in at least one embodiment of the present invention. The phrase appearing at various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

"A plurality of" means two or more than two. The term "and/or" describes an association relationship for describing associated objects and indicates that three relationships may exist. For example, A and/or B may indicate the following three cases: Only A exists, both A and B exist, and only B exists. The character "/" generally indicates an "or" relationship between the associated objects.

The following describes embodiments of this application with reference to the accompanying drawings.

Figure 1A:
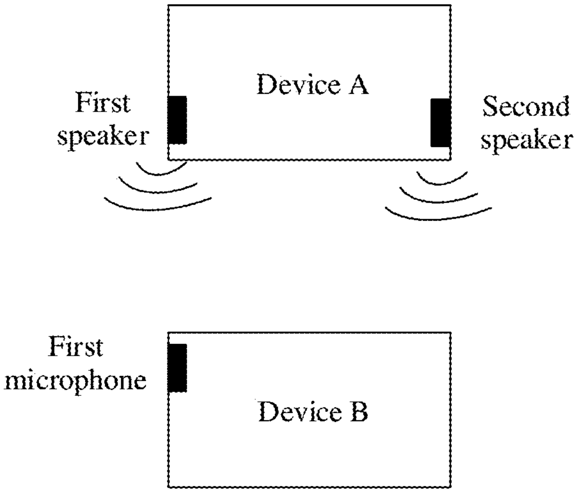
FIG. 1*a* is a schematic diagram of a system architecture according to an embodiment of this application.

FIG. 1*a* is a schematic diagram of a system architecture according to an embodiment of this application. As shown in FIG. 1*a*, the system architecture includes a device A and a device B. The device A includes at least two speakers. FIG. 1*a* shows only two speakers of the device A: a first speaker and a second speaker. Optionally, parameters of the first speaker and the second speaker are consistent, and the first speaker and the second speaker are symmetrically distributed on the device A. The device B includes at least one microphone. FIG. 1*a* shows only one microphone of the device B, and the microphone is a first microphone.

Two speakers in the at least two speakers of the device A send audio signals in sequence. The audio signals may be ultrasonic waves, or may be audio signals whose frequencies are lower than an ultrasonic frequency, for example, audio signals that can be heard by a person and audio signals whose frequencies are lower than frequencies of the audio signals that can be heard by the person.

The first microphone in the at least one microphone of the device B captures the audio signals sent by the two microphones of the device A, and the device B determines a relative location between the device B and the device A based on the captured audio signals.

Optionally, when a quantity of microphones in the device B is greater than 1, the first microphone of the device B meets the following condition:

Condition 1: a microphone that is in a plurality of microphones of the device B and that has a maximum difference between a distance from the first speaker and a distance from the second speaker, where the difference is greater than a second preset distance; or Condition 2: a microphone that is in a plurality of microphones of the device B and that is least blocked by the device B relative to the first speaker and the second speaker.

It should be noted herein that there are microphones that meet Condition 1 and Condition 2 in the device B, and a microphone that meets a condition with a higher priority is selected as the first microphone of the device B based on priorities of conditions. Optionally, a priority of Condition 1 is higher than or lower than a priority of Condition 2.

Figure 1B:
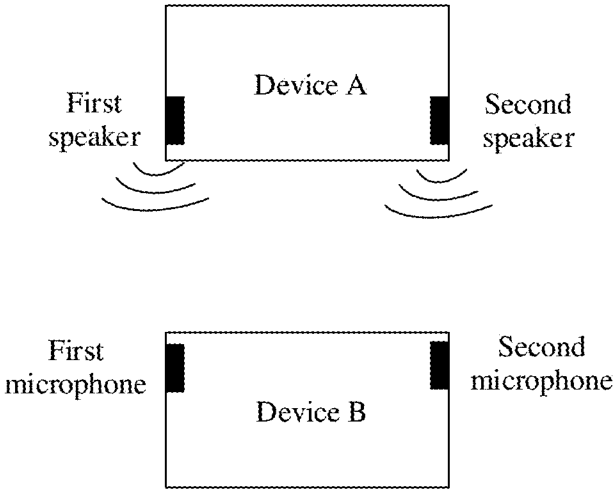
FIG. 1*b* is a schematic diagram of another system architecture according to an embodiment of this application.

Optionally, to improve precision of the determined relative location between the device B and the device A, the device B includes at least two microphones. FIG. 1*b* shows two microphones of the device B: a first microphone and a second microphone. The first microphone and the second microphone of the device B capture the audio signals generated by the two speakers of the device A, and determine a relative location between the device A and the device B based on the audio signals captured by the first microphone and the second microphone of the device B.

In a feasible embodiment, when a quantity of microphones included in the device B is greater than 2, the first microphone and the second microphone of the device B meet the following condition:

Condition 3: two microphones that are farthest from each other in a plurality of microphones of the device B;

Condition 4: two microphones that are in a plurality of microphones of the device B and that each has a difference, greater than the second preset distance, between a distance from the first speaker of the device A and a distance from the second speaker of the device A; or Condition 5: two microphones that are in a plurality of microphones of the device B and that are least blocked by the device B relative to the first speaker and the second speaker of the device A.

It should be noted herein that, when there are a plurality of pairs of microphones (each pair of microphones includes two microphones) that meet Condition 3, Condition 4, and Condition 5 in the device B, a pair of microphones that meets a condition with a higher priority may be selected as the first microphone and the second microphone of the device B based on priorities of Condition 3, Condition 4, and Condition 5.

Optionally, a priority of Condition 3 is higher than a priority of Condition 4, and the priority of Condition 4 is higher than a priority of Condition 5. Alternatively, a priority of Condition 5 is higher than a priority of Condition 4, and the priority of Condition 4 is higher than a priority of Condition 3. Alternatively, a priority of Condition 4 is higher than a priority of Condition 5, and the priority of Condition 5 is higher than a priority of Condition 3. It should be understood that this is merely an example, and does not constitute a limitation on this application. Certainly, the priorities of Condition 3, Condition 4, and Condition 5 may alternatively be in another form.

Figure 4:
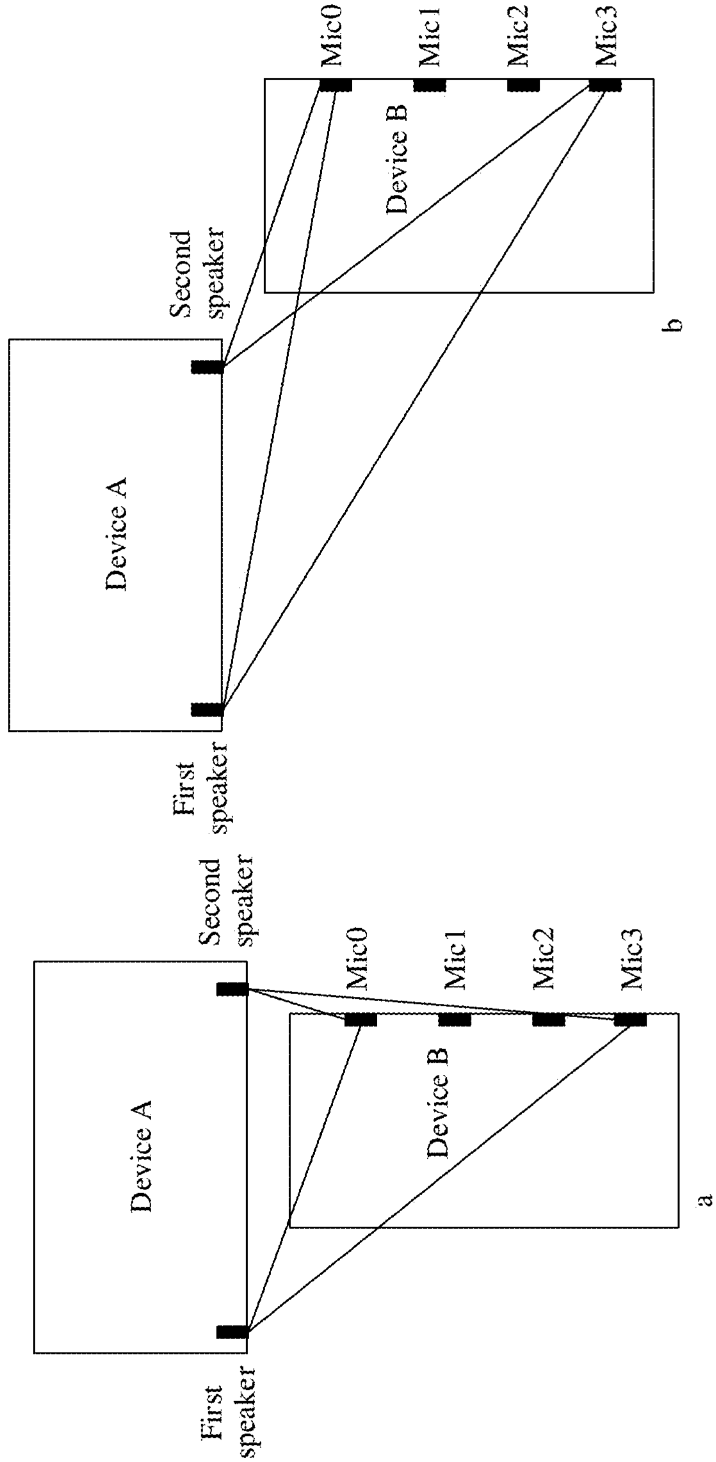
FIG. 4 is a schematic diagram of a principle of a microphone selection policy according to an embodiment of this application.

A degree to which the microphone of the device B is blocked by the device B relative to the device A may be determined in the following two manners:

Manner 1: A length of a line segment that passes through the device B in a connection line starting from a microphone and ending at a speaker is determined. A longer line segment indicates a higher degree to which the microphone is blocked by the device B. As shown in a in FIG. 4, a length of a line segment that passes through the device B in a connection line between a mic0 and the first speaker is less than a length of a line segment that passes through the device B in a connection line between a mic3 and the first speaker. Therefore, relative to the first speaker, a degree to which the mic0 is blocked by the device B is lower than a degree to which the mic3 is blocked by the device B.

Manner 2: An audio signal from the first speaker received by the microphone is obtained, and then the audio signal is processed in a preprocessing manner in this application, to obtain a processed audio signal. An audio segment is obtained from the processed audio signal in a manner in this application, and then a quantity of wave peaks whose peak values exceed a preset amplitude in the audio segment is obtained. A larger quantity indicates a higher degree to which the microphone is blocked by the device B.

Manner 3: The device B captures, by using a default microphone, a first audio signal emitted by the first speaker of the device A and a second audio signal emitted by the second speaker of the device A, and then determines a relative location relationship with low precision by using the method in this application. Because the device B knows a type of the device A, for example, a Huawei laptop computer or a Huawei phone, the device B knows a location of a speaker of the device A, and may also know a distance between the first speaker and the second speaker of the device A. Therefore, on a premise of the relative location relationship with low precision, one or two microphones with a lowest blocking degree are selected from the device B in Manner 1.

Specifically, that the first microphone and the second microphone of the device B are the two microphones that are in the plurality of microphones of the device B and that each has the difference, greater than the second preset distance, between the distance from the first speaker of the device A and the distance from the second speaker of the device A includes: When there are a plurality of microphones that each has a difference, greater than the second preset distance, between a distance from the first speaker of the device A and a distance from the second speaker of the device A, in the plurality of microphones of the device B, two microphones are randomly selected from the plurality of microphones as the first microphone and the second microphone of the device B, or two microphones that each have a maximum difference are selected from the plurality of microphones as the first microphone and the second microphone of the device B.

It should be noted that, in this solution of this application, the relative location between the device A and the device B may be determined based on a difference between the distances between the microphone and the two speakers. When the difference is small, the relative location between the device A and the device B cannot be accurately determined.

Figure 3:
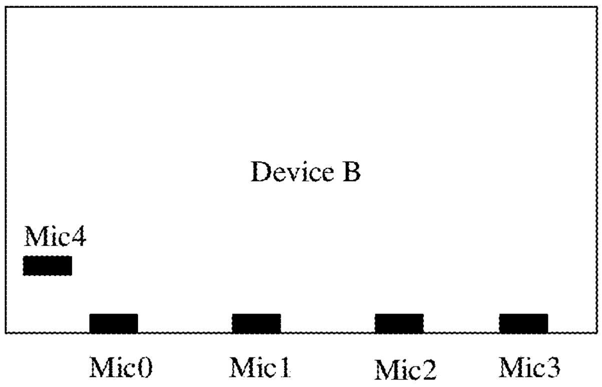
FIG. 3 is a schematic diagram of a location of a microphone of a device B according to an embodiment of this application.

For example, an example in which the device A is a laptop computer and the device B is a pad is used to describe how to select a microphone: The laptop computer is located on a table, the pad includes five microphones: a mic0, a mic1, a mic2, a mic3, and a mic4, locations of the five microphones are shown in FIG. 3.

When the pad is placed on a support on the table, and the mic0, the mic1, the mic2, and the mic3 face downwards (that is, face the table), because the mic4 is on the back of the pad and is completely blocked by the pad, and the mic1 and the mic2 may be blocked by the support, the mic4, the mic1, and the mic2 are not considered during microphone selection, and the first microphone and the second microphone are the mic0 and the mic3. Further, a reason why the mic0 and the mic3 are selected as the first microphone and the second microphone is that the mic0 and the mic3 are two microphones that are farthest from each other in the mic0, the mic1, the mic2, and the mic3. Further, the mic0 and the mic3 are the two microphones that are farthest from each other in the mic0, the mic1, the mic2, and the mic3, and both a difference between distances between the mic0 and two speakers of the laptop computer and a difference between distances between the mic3 and the two speakers of the laptop computer are greater than the second preset distance.

When the pad is placed on the support on the table, and the mic0, the mic1, the mic2, and the mic3 face upwards (that is, face the ceiling or the sky), because the mic4 is on the back of the pad and completely blocked by the pad, the mic4 is not considered during microphone selection, and the first microphone and the second microphone are the mic0 and the mic3. A reason why the mic0 and the mic3 are selected as the first microphone and the second microphone is that the mic0 and the mic3 are two microphones that are farthest from each other in the mic0, the mic1, the mic2, and the mic3. Further, the mic0 and the mic3 are the two microphones that are farthest from each other in the mic0, the mic1, the mic2, and the mic3, and both a difference between distances between the mic0 and two speakers of the laptop computer and a difference between distances between the mic3 and the two speakers of the laptop computer are greater than the second preset distance.

When the pad is placed on the support on the table, and the mic0, the mic1, the mic2, and the mic3 are on the left or the right, if both a difference between distances between the mic0 and two speakers of the laptop computer and a difference between distances between the mic4 and the two speakers of the laptop computer are greater than the second preset distance, the mic and the mic2 are as the first microphone and the second microphone.

When the pad is horizontally placed on the table, and the mic0, the mic1, the mic2, and the mic3 face a direction far away from the laptop computer, or when the pad is horizontally placed on the table, and the mic0, the mic1, the mic2, and the mic3 face a direction of the laptop computer, because the mic4 is on the back of the pad and is completely blocked by the pad, the mic4 is not considered during microphone selection, and the first microphone and the second microphone are the mic0 and the mic3. A reason why the mic0 and the mic3 are selected as the first microphone and the second microphone is that the mic0 and the mic3 are two microphones that are farthest from each other in the mic0, the mic1, the mic2, and the mic3. Further, the mic0 and the mic3 are the two microphones that are farthest from each other in the mic0, the mic1, the mic2, and the mic3, and both a difference between distances between the mic0 and two speakers of the laptop computer and a difference between distances between the mic3 and the two speakers of the laptop computer are greater than the second preset distance.

When the pad is horizontally placed on the table, and the mic0, the mic1, the mic2, and the mic3 face rightwards, the mic2 and the mic3 are used as the first microphone and the second microphone. If the mic0 and the mic1 are selected, when the pad is located in front and right front of the laptop computer, as shown in a and b in FIG. 4, a difference between distances between the mic0 and a first speaker and between the mic0 and a second speaker of the laptop computer may be less than the second preset distance, and a difference between a moment at which the mic0 receives an audio signal generated by the first speaker and a moment at which the mic0 receives an audio signal generated by the second speaker is small. As a result, a location of the pad relative to the laptop computer cannot be calculated based on the difference. Therefore, the mic2 and the mic3 are selected as the first microphone and the second microphone. Both a difference between distances between the mic2 and two speakers of the laptop computer and a difference between distances between the mic3 and the two speakers of the laptop computer are greater than the second preset distance, and a difference between moments at which the mic2 and the mic3 respectively receive audio signals generated by the two speakers is large, so that the location of the pad relative to the laptop computer may be calculated based on the difference.

Figure 5:
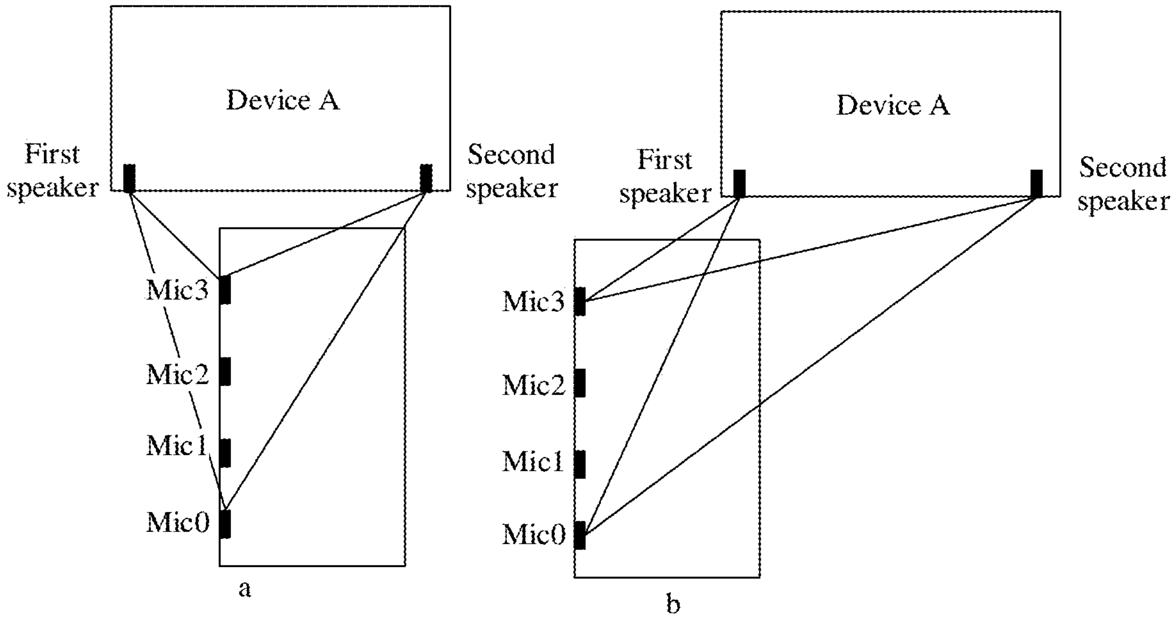
FIG. 5 is a schematic diagram of a principle of another microphone selection policy according to an embodiment of this application.

When the pad is horizontally placed on the table, and the mic0, the mic1, the mic2, and the mic3 face leftwards, the mic0 and the mic are used as the first microphone and the second microphone. If the mic2 and the mic3 are selected, when the pad is located in front and left front of the laptop computer, as shown in a and b in FIG. 5, a difference between distances between the mic3 and a first speaker and a second speaker of the laptop computer may be less than the second preset distance, and a difference between a moment at which the mic3 receives an audio signal generated by the first speaker and a moment at which the mic3 receives an audio signal generated by the second speaker is small. As a result, a location of the pad relative to the laptop computer cannot be calculated based on the difference. Therefore, the mic0 and the mic are selected as the first microphone and the second microphone. Both a difference between distances between the mic0 and two speakers of the laptop computer and a difference between distances between the mic1 and the two speakers of the laptop computer are greater than the second preset distance, and a difference between moments at which the mic0 and the mic1 respectively receive audio signals generated by the two speakers is large, so that the location of the pad relative to the laptop computer may be calculated based on the difference.

Optionally, the microphone of the device B may be manually predetermined in the foregoing manner, or may be selected by the device B according to the foregoing selection policy.

It should be noted herein that the device B may select the first microphone, or the first microphone and the second microphone of the device B based on an instruction of a user. Optionally, after a relative location between devices is determined once, the first microphone, or the first microphone and the second microphone of the device B are automatically reselected.

Figure 2A:
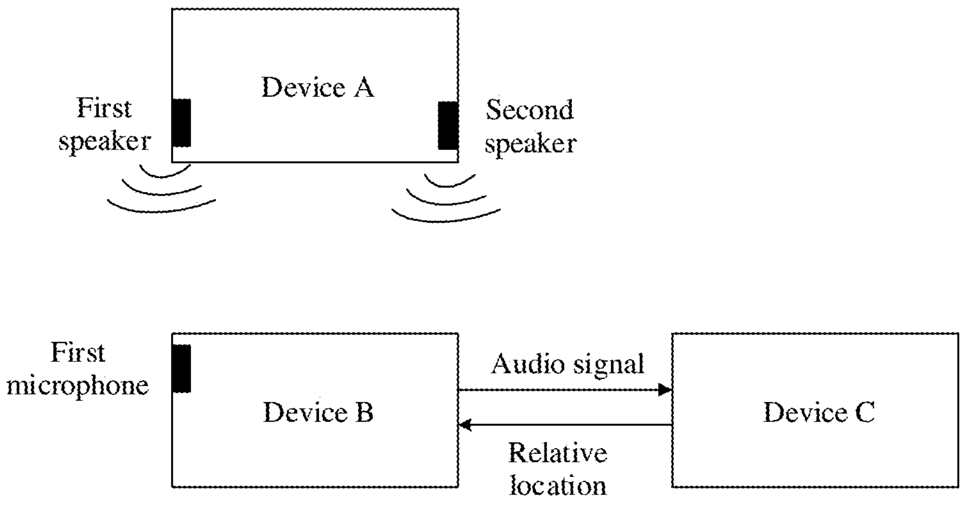
FIG. 2*a* is a schematic diagram of another system architecture according to an embodiment of this application.
Figure 2B:
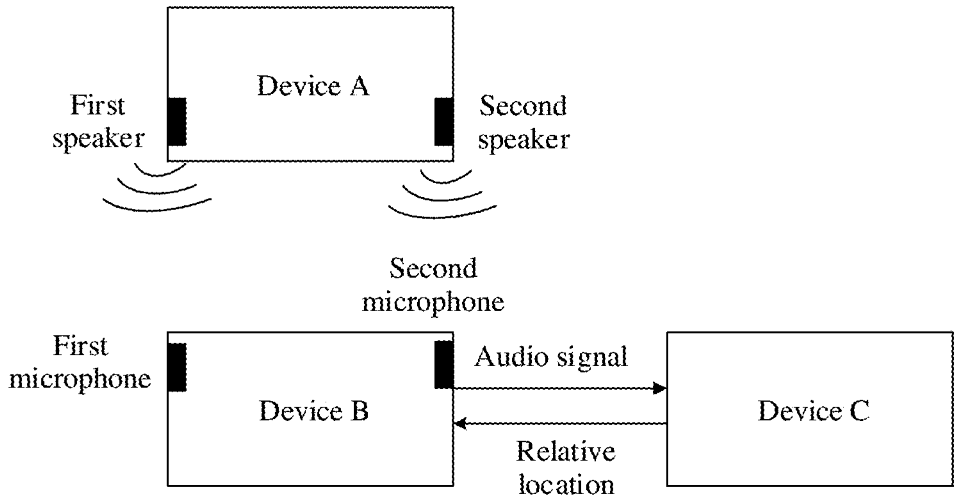
FIG. 2*b* is a schematic diagram of another system architecture according to an embodiment of this application.

In a feasible embodiment, when computing power of the device B is low, the device B sends a captured audio signal to a device C, the device C determines a relative location between the device B and the device A based on the audio signal captured by the device B, and the device C sends the relative location between the device B and the device A to the device C, as shown in FIG. 2*a* and FIG. 2*b*.

It should be noted herein that the relative location between the device B and the device A includes a location of the device B relative to the device A. After the location of the device B relative to the device A is determined, a location of the device A relative to the device B may be determined based on the location of the device B relative to the device A.

Figure 6A:
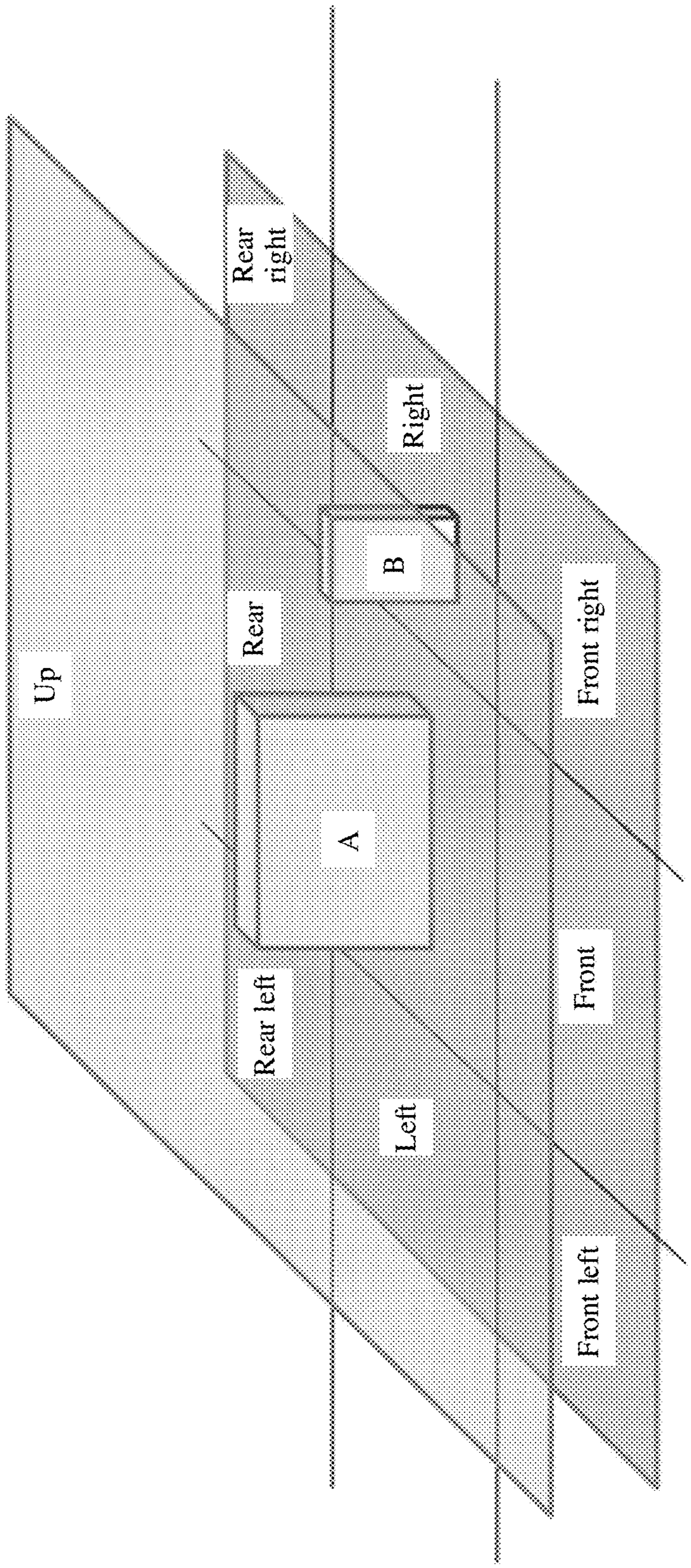
FIG. 6*a* is a schematic diagram of a relative location between devices.

As shown in FIG. 6*a*, the location of the device B relative to the device A includes that the device B is in front, rear, left, right, front left, rear left, front right, and rear right of the device A. Optionally, an identifier used to represent a relative location is obtained by performing an algorithm in this application, and when the identifier has different values, the identifier is used to represent different relative locations. For example, a value range of the identifier is [1, 2, 3, 4, 5, 6, 7, 8], which is used to represent the foregoing eight relative locations.

In a feasible embodiment, when the device A detects an orientation sensing instruction triggered by a user, the device A generates an orientation sensing request, and sends the orientation sensing request to device B. The orientation sensing instruction may be a preset gesture of the user, a touch instruction of the user for a display interface of the device A, or a voice instruction of the user, or certainly may be an instruction based on another manner. The first speaker and the second speaker of the device A respectively generate a first audio signal and a second audio signal. After receiving the orientation sensing request sent by the device A, the device B selects, in the foregoing manner, a microphone or a microphone that is set by the user by default, to obtain a target audio signal, where the target audio signal is obtained based on the first audio signal generated by the first speaker of the device A and the second audio signal generated by the second speaker of the device A. Optionally, the orientation sensing request carries a moment at which the first speaker of the device A emits the first audio signal and a moment at which the second speaker of the device A emits the second audio signal. Optionally, the orientation sensing request further carries the distance between the first speaker and the second speaker of the device A.

Optionally, when the device B detects an orientation sensing instruction triggered by a user, the device B generates an orientation sensing request, and sends the orientation sensing request to the device A. The device B selects, in the foregoing manner, a microphone or a microphone that is set by the user by default, to receive audio signals generated by the first speaker and the second speaker. After the device A receives the orientation sensing request, the first speaker and the second speaker of the device A respectively generate the audio signals in sequence based on a time interval.

Optionally, when the device C detects an orientation sensing instruction triggered by a user, the device C generates an orientation sensing request, and sends the orientation sensing request to the device A and the device B. After receiving the orientation sensing request, the device B selects a microphone or a microphone set by the user by default in the foregoing manner, to obtain a target audio signal, where the target audio signal is obtained based on a first audio signal generated by the first speaker of the device A and a second audio signal generated by the second speaker. After the device A receives the orientation sensing request, the first speaker and the second speaker of the device A respectively generate the first audio signal and the second audio signal.

A microphone of the device B obtains the target audio signal, and then the device B may determine, based on the obtained target audio signal, a relative location between the device A and the device B by using the method in this application. The device B may alternatively send the obtained target audio signal to the device A or the device C, and the device A or the device C determines a relative location between the device A and the device B by using the method in this application. If the device A determines the relative location between the device A and the device B, the device A sends the relative location to the device B after determining the relative location between the device A and the device B. If the device C determines the relative location between the device A and the device B, the device C sends the relative location between the device A and the device B to the device A and the device B after determining the relative location between the device A and the device B.

Figure 7:
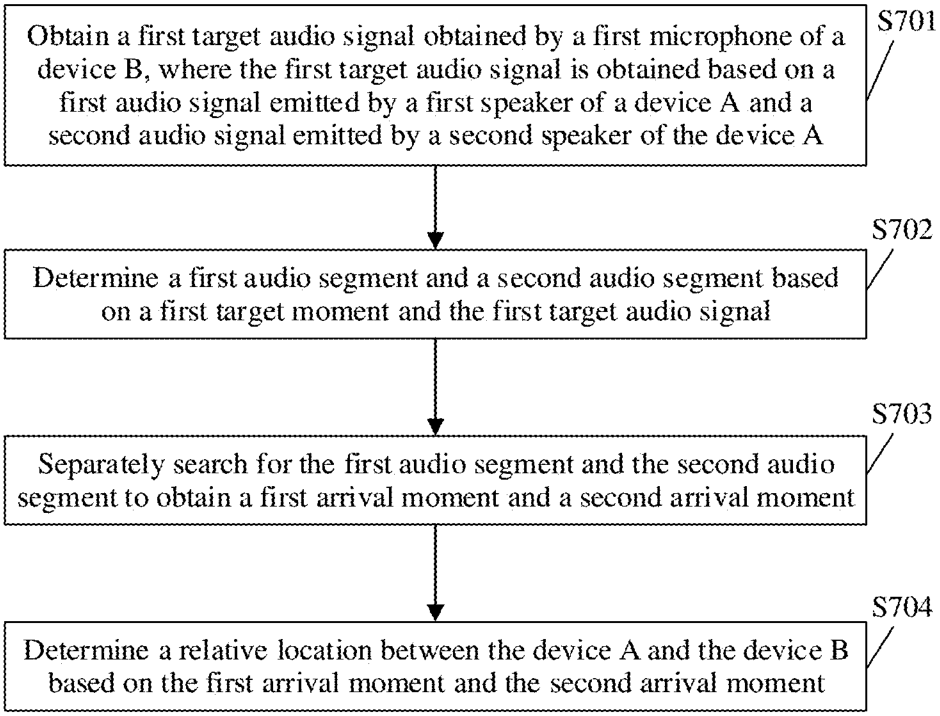
FIG. 7 is a schematic flowchart of a method for detecting a relative location between devices according to an embodiment of this application.

Optionally, when an embodiment shown in FIG. 7 is executed by the device B or the device C, the device A may further send, to the device B or the device C, a moment at which the first speaker of the device A emits the first audio signal and a moment at which the second speaker of the device A emits the second audio signal. Optionally, the device A may further send the distance between the first speaker and the second speaker of the device A to the device B or the device C.

Optionally, the target audio signal includes a first target audio signal. Optionally, the target audio signal further includes a second target audio signal. The first target audio signal is obtained by the first microphone of the device B based on the first audio signal emitted by the first speaker of the device A and the second audio signal emitted by the second speaker of the device A, and the second target audio signal is obtained by the second microphone of the device B based on the first audio signal emitted by the first speaker of the device A and the second audio signal emitted by the second speaker of the device A.

Figure 6B:
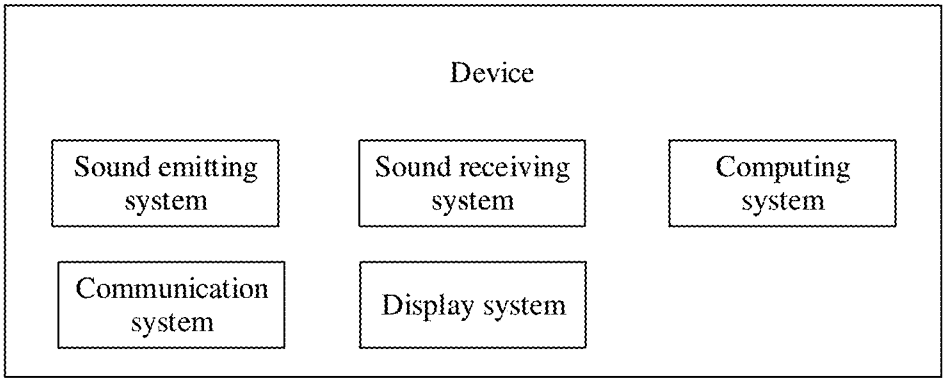
FIG. 6*b* is a schematic diagram of a structure of a device.

In an optional embodiment, as shown in FIG. 6*b*, the device A includes a generation system and a communication system, and the device B includes a voice receiving system and a communication system. If the device A determines, based on a target audio signal obtained by the device B, a relative location between the device A and the device B by using the method in this application, the device A further includes a computing system. The communication system of the device A receives the target audio signal sent by the device B by using the communication system. The computing system of the device A determines, based on the obtained target audio signal, the relative location between the device A and the device B by using the method in this application, and sends the relative location between the device A and the device B to the device B by using the communication system. The device B receives, by using the communication system, the relative location between the device A and the device B sent by the device A.

If the device B determines, based on an obtained target audio signal, a relative location between the device A and the device B by using the method in this application, the device B further includes a computing system. The computing system of the device B determines, based on the obtained target audio signal, the relative location between the device A and the device B by using the method in this application, and sends the relative location between the device A and the device B to the device A by using the communication system. The device A receives, by using the communication system, the relative location between the device A and the device B sent by the device A. Optionally, the device A sends, to the device B by using the communication system of the device A, the moment at which the first speaker of the device A emits the first audio signal and the moment at which the second speaker of the device A emits the second audio signal. Optionally, the device A sends the distance between the first speaker and the second speaker of the device A to the device B by using the communication system of the device A.

Optionally, the device A and the device B each further include a display system. The display system of the device A and the display system of the device B display content based on the relative location between the device A and the device B.

The following describes how to determine a relative location between a device A and a device B based on an audio signal obtained by a microphone of the device B.

FIG. 7 is a schematic flowchart of a method for detecting a relative location between devices according to an embodiment of this application. As shown in FIG. 7, the method includes the following steps.

S701: Obtain a first target audio signal obtained by a first microphone of the device B, where the first target audio signal is obtained based on a first audio signal emitted by a first speaker of the device A and a second audio signal emitted by a second speaker of the device A.

A time period within which the first speaker of the device A emits the first audio signal may overlap or may not overlap a time period within which the second speaker of the device A emits the second audio signal.

Optionally, a parameter of the first speaker and a parameter of the second speaker of the device A are the same or different. The first speaker and the second speaker of the device A are symmetrically distributed on the device A. As shown in FIG. 1*a*, FIG. 1*b*, FIG. 2*a*, and FIG. 2*b*, the first speaker and the second speaker of the device A are symmetrically distributed on the device A by using a vertical line that passes through a center point of the device A as a symmetry axis. It should be understood that this is merely an example, and is not intended to limit this application. The first speaker and the second speaker of the device A may be distributed on the device A in another manner.

Specifically, obtaining the first target audio signal by using the first microphone of the device B includes:

The first audio signal sent by the first speaker of the device A and the second audio signal sent by the second speaker of the device A are received by using the device B, and the received audio signal is filtered to obtain a filtered audio signal. Optionally, the received audio signal is input to a band-pass filter to be processed, to obtain a filtered audio signal. Filtering is to filter out noise on a non-operating frequency from the received audio signal. Then the received audio signal is segmented in a time sequence to obtain a plurality of audio segments, whether energy of each of the plurality of audio segments exceeds a preset energy threshold is determined, and an audio segment whose energy does not exceed the preset energy threshold is deleted from the filtered audio signal to obtain an energy-filtered audio signal. Energy of the audio segment is defined as an integral of sound intensity of the audio segment in time. Matched filtering is performed on the energy-filtered audio signal, to obtain an audio signal obtained through matched filtering. Optionally, a matched filtering manner corresponding to a type of the audio signal may be used based on the type. For example, when the received audio signal is a modulated signal, a matched filtering manner corresponding to the modulated signal is used for filtering, to obtain an audio signal obtained through matched filtering. Filtering is performed in this manner, so that signal strength of an unmodulated audio signal is attenuated, and signal strength of a modulated audio signal is enhanced. The audio signal obtained through matched filtering is the first target audio signal.

Optionally, the modulated signal may be a linear chirp (chirp) signal or a non-linear chirp signal.

S702: Determine a first audio segment and a second audio segment based on a first target moment and the first target audio signal.

The first target moment is a moment corresponding to a target amplitude in the first target audio signal. When there are a plurality of moments corresponding to the target amplitude in the first target audio signal, the first target moment is an earliest moment in the plurality of moments. The first audio segment and the second audio segment respectively correspond to a segment in the first audio signal and a segment in the second audio signal in the first target audio signal. The target amplitude may be an average value of all wave peaks in the first target audio signal, or may be a maximum signal amplitude in the first target audio signal.

In a feasible embodiment, the first audio segment and the second audio segment may be determined in a first manner, and a specific process is as follows:

The first audio segment is determined from the first target audio signal based on the first target moment, a distance between the first speaker and the second speaker of the device A, and a sampling frequency of the first microphone of the device B. The second audio segment is determined from the first target audio signal based on the first target moment, the distance between the first speaker and the second speaker of the device A, the sampling frequency of the first microphone of the device B, and a time interval between a moment at which the first speaker of the device A emits the first audio signal and a moment at which the second speaker of the device A emits the second audio signal.

Further, determining the first audio segment from the first target audio signal based on the first target moment, the distance between the first speaker and the second speaker of the device A, and the sampling frequency of the first microphone of the device B includes:

A first time range is determined based on the first target moment, the distance between the first speaker and the second speaker of the device A, and the sampling frequency of the first microphone of the device B. A start moment of the first time range is $ind\_max-2\times(d/v)\times f$, an end moment of the first time range is $ind\_max+2\times(D/v)\times f$, ind_max is the first target moment, d is a first preset distance, D is the distance between the first speaker and the second speaker of the device A, v is a sound velocity, and f is the sampling frequency of the first microphone of the device B. The first audio segment is determined from the first target audio signal based on the first time range. The first audio segment is an audio segment corresponding to the first time range in the first target audio signal.

Optionally, the first preset distance may be a preset value, and may be preset based on an application scenario. For example, in an open area, the preset distance is 10 m, and in a scene of a room, the preset distance is 5 m. Certainly, the preset distance is determined based on a product of a preset time period and the sound velocity.

Figure 8A:
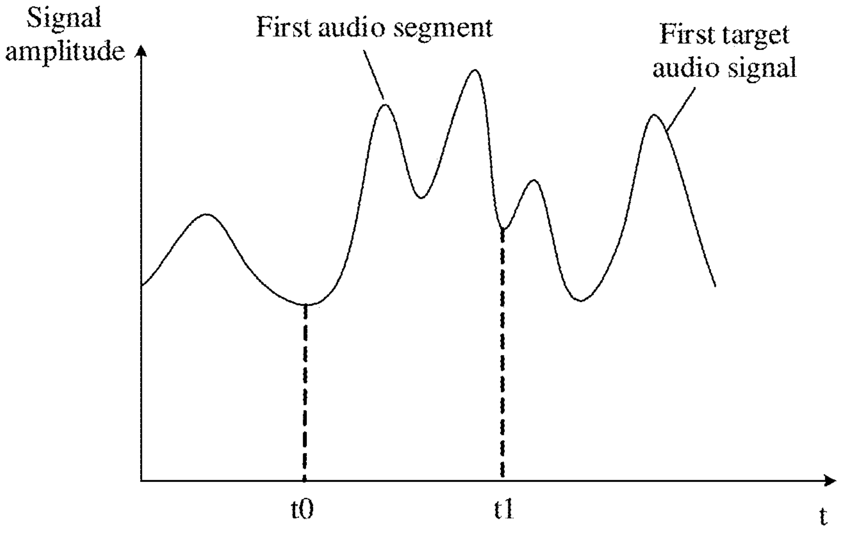
FIG. 8*a* is a schematic diagram of a relationship between an audio signal and an audio segment.

A relationship among the first target audio signal, the first time range, and the first audio segment is described by using an example. As shown in FIG. 8*a*, the first time range is [t0, t1], and the first audio segment is an audio signal segment corresponding to the first time range [t0, t1] in the first target audio signal.

In a feasible embodiment, determining the second audio segment from the first target audio signal based on the first target moment, the distance between the first speaker and the second speaker, the sampling frequency of the first microphone, and the time interval between the moment at which the first speaker generates the first audio signal and the moment at which the second speaker generates the second audio signal includes:

A second time range is determined based on the first target moment, the distance between the first speaker and the second speaker, the sampling frequency of the first microphone, and the time interval. A start moment of the second time range is ind_max−2×(d/v)×f−$T_1$, an end moment of the second time range is ind_max+2×(D/v)×f−$T_1$, ind_max is the first target moment, d is the first preset distance, D is the distance between the first speaker and the second speaker, v is the sound velocity, f is the sampling frequency of the first microphone, and $T_1$ is the time interval. The second audio segment is determined from the first target audio signal based on the second time range.

Figure 8B:
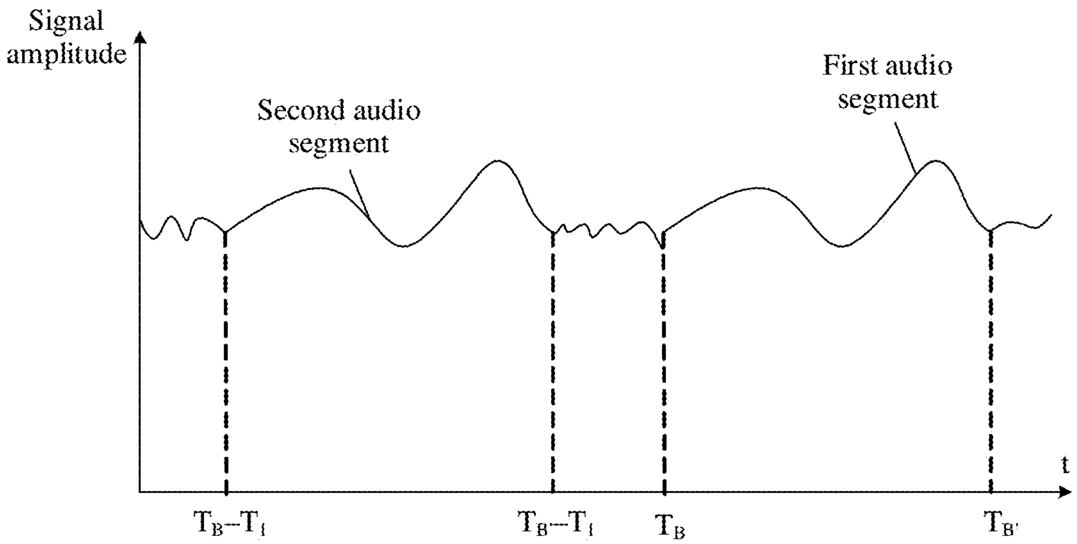
FIG. 8*b* is a schematic diagram of a relationship between a first audio segment and a second audio segment.

As shown in FIG. 8*b*, it is assumed that the first speaker of the device A first emits the first audio signal, and then the second speaker of the device A emits the second audio signal. As shown in FIG. 8*b*, in the first target audio signal obtained by the first microphone of the device B, the first audio segment precedes the second audio signal. After the first audio signal is determined, it can be learned, based on a time range [$T_{B'}$, $T_B$] corresponding to the first audio segment and the time interval $T_1$, that a time range corresponding to the second audio segment in the first target audio signal is [$T_{B'}$−$T_1$, $T_B$−$T_1$], to determine the second audio segment from the first target audio signal.

Optionally, determining the second audio signal from the first audio signal based on the first target moment, the distance between the first speaker and the second speaker of the device A, the sampling frequency of the first microphone of the device B, and the time interval includes:

A third time range and a fourth time range are determined based on the first target moment, the distance between the first speaker and the second speaker of the device A, the sampling frequency of the first microphone of the device B, and the time interval. A start moment of the third time range is ind_max−2×(d/v)×f+$T_1$, an end moment of the third time range is ind_max+$T_1$+2×(D/v)×f, a start moment of the fourth time range is ind_max−2×(d/v)×f−$T_1$, an end moment of the fourth time range is ind_max−$T_1$+2×(D/v)×f. The second audio segment is obtained from a third audio segment and a fourth audio segment. The second audio segment is an audio segment in which a ratio of a maximum signal amplitude to an LOS signal amplitude falls within a preset range in the third audio segment and the fourth audio segment, the third audio segment is an audio segment corresponding to the third time range in the first target audio signal, and the fourth audio segment is an audio segment corresponding to the fourth time range in the first target audio signal.

The following specifically describes how to determine the second audio segment from the first target audio signal based on the first target moment, the distance between the first speaker and the second speaker of the device A, the sampling frequency of the first microphone of the device B, and the time interval between the moment at which the first speaker of the device A generates an audio signal and the moment at which the second speaker of the device A generates an audio signal.

Figure 8C:
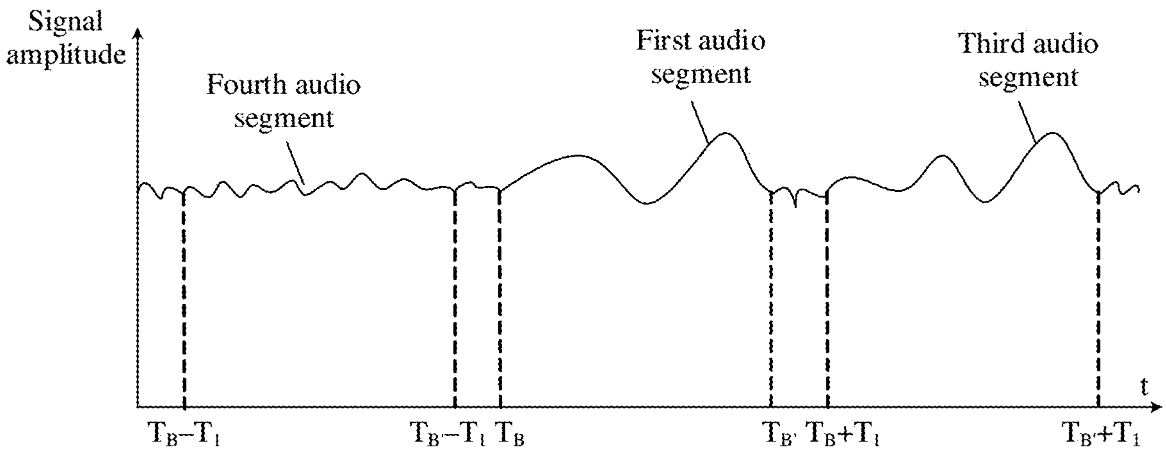
FIG. 8*c* is a schematic diagram of relationships between a first audio segment and a third audio segment and between the first audio segment and a fourth audio segment.

For the device B, a sound emitting sequence of the first speaker and the second speaker of the device A is unknown, and the second audio segment may precede the first audio segment, or may follow the first audio segment. Therefore, after it is determined that the first audio segment is determined from the first target audio signal, the second audio segment is searched for around the first audio segment. As shown in FIG. 8*c*, after the first audio signal is determined, it can be learned, based on the time range [$T_{B'}$, $T_B$] corresponding to the first audio segment and the time interval $T_1$, that a time range corresponding to the third audio segment in the first target audio signal is a [$T_{B'}$+T1, $T_B$+T1] and a time range corresponding to the fourth audio segment in the first target audio signal is [$T_{B'}$−$T_1$, $T_B$−$T_1$], and then the second audio segment is determined from the third audio segment and the fourth audio segment. The step is specifically performed in the following manner:

A third time range and a fourth time range are determined based on the first target moment, the distance between the first speaker and the second speaker of the device A, the sampling frequency of the first microphone of the device B, and the time interval. A start moment of the third time range is ind_max−2×(d/v)×f+$T_1$, an end moment of the third time range is ind_max+$T_1$+2×(D/v)×f, a start moment of the fourth time range is ind_max−2×(d/v)×f−$T_1$, an end moment of the fourth time range is ind_max−$T_1$+2×(D/v)×f, ind_max is the first target moment, d is the first preset distance, D is the distance between the first speaker and the second speaker of the device A, v is the sound velocity, f is the sampling frequency of the first microphone of the device B, and $T_1$ is the time interval. The third audio segment and the fourth audio segment are respectively determined from the first target audio signal based on the third time range and the fourth time range. The third audio segment and the fourth audio segment are respectively audio segments corresponding to the third time range and the fourth time range in the first target audio signal. Then an audio segment that meets a preset condition is selected from the third audio segment and the fourth audio segment. The audio segment is the second audio segment. The preset condition includes: a ratio of a maximum signal amplitude to an LOS signal amplitude in the audio segment falls within a preset range. Optionally, the preset range may be [0.4, 0.6]. Certainly, the preset range may alternatively be another range. An LOS signal is a signal that is transmitted to a receive end through a minimum path without being reflected by an obstacle.

$$T_B = ind\_\max - 2\times(d/v)\times f, \text{ and } T_B = ind\_\max + 2\times(D/v)$$

Optionally, after the third time range and the fourth time range are determined, an audio segment corresponding to any one of the third time range and the fourth time range is first obtained from the first target audio signal based on the any time range, and then whether the audio segment meets the preset condition is determined. When the audio segment meets the preset condition, the audio segment is used as the second audio segment. When the audio segment does not meet the preset condition, an audio segment corresponding to the other one of the third time range and the fourth time range is used as the second audio segment.

It should be understood that, in the audio segments corresponding to the third time range and the fourth time range in the first target audio signal, one audio signal definitely meets the preset condition. Therefore, after it is determined that an audio segment corresponding to one time range meets the preset condition, an audio segment corresponding to the other time range does not need to be determined.

In a feasible embodiment, the first audio segment and the second audio segment may be determined in a second manner, and a specific process is as follows:

The first target audio signal includes a third audio signal and a fourth audio signal, the third audio signal is the first audio signal that is emitted by the first speaker of the device A and that is received by the first microphone of the device B, and the fourth audio signal is the second audio signal that is emitted by the second speaker of the device A and that is received by the first microphone of the device B. A fifth time range is determined based on the first target moment and a preset time threshold, and a sixth time range is determined based on a second target moment and the preset time threshold. The first target moment is a moment determined in the third audio signal based on the target amplitude, the second target moment is a moment determined in the fourth audio signal based on the target amplitude, an end moment of the fifth time range is the first target moment, an end moment of the sixth time range is the second target moment, and both duration of the fifth time range and duration of the sixth time range are the preset time threshold. The first audio segment is obtained from the third audio signal based on the fifth time range, and the second audio segment is obtained from the fourth audio signal based on the sixth time range. The first audio segment is an audio signal segment corresponding to the fifth time range in the third audio signal, and the second audio segment is an audio signal segment corresponding to the sixth time range in the fourth audio signal.

The preset time threshold is obtained based on a first preset distance and a time interval between a moment at which the first speaker of the device A generates the first audio signal and a moment at which the second speaker of the device A generates the second audio signal.

Specifically, after the first target moment ind_max and the second target moment ind_max' are obtained, the fifth time range and the sixth time range are determined based on the first target moment ind_max, the second target moment ind_max', and the preset time threshold $T_A$. A start moment of the fifth time range is ind_max$-T_A$, the end moment of the fifth time range is ind_max, the start moment of the second time range is ind_max'−TA, the end moment of the second time range is ind_max', the preset time threshold $T_A=T_1+2\times d/v$, $T_1$ is the foregoing time interval, d is the preset distance, v is the sound velocity, and $T_A$ is greater than a difference between an end moment and a start moment of a range obtained when multipath interference is eliminated. Then, the first audio segment is obtained from the third audio signal based on the fifth time range, and the second audio segment is obtained from the fourth audio signal based on the sixth time range. The first audio segment is an audio signal segment corresponding to the fifth time range in the third audio signal, and the second audio segment is an audio signal segment corresponding to the sixth time range in the fourth audio signal.

S703: Separately search for the first audio segment and the second audio segment to obtain a first arrival moment and a second arrival moment.

The first arrival moment corresponds to a wave peak with earliest receiving time in wave peaks whose signal amplitudes are greater than a first preset amplitude in the first audio signal, and the arrival moment corresponds to a wave peak with earliest receiving time in wave peaks whose signal amplitudes are greater than a second preset amplitude in the second audio signal.

Optionally, the first preset amplitude and the second preset amplitude may be the same, or may be different.

Specifically, after the first audio segment is determined, the wave peak whose signal amplitude is greater than the first preset amplitude is searched for in the first audio segment, then the wave peak with earliest receiving time is selected from the wave peaks whose signal amplitudes are greater than the first preset amplitude, and a moment corresponding to the wave peak is used as the first arrival moment. Similarly, the wave peak whose signal amplitude is greater than the second preset amplitude is searched for in the second audio signal, then the wave peak with earliest receiving time is selected from the wave peaks whose signal amplitudes are greater than the second preset amplitude, and a moment corresponding to the wave peak is used as the second arrival moment.

Figure 9:
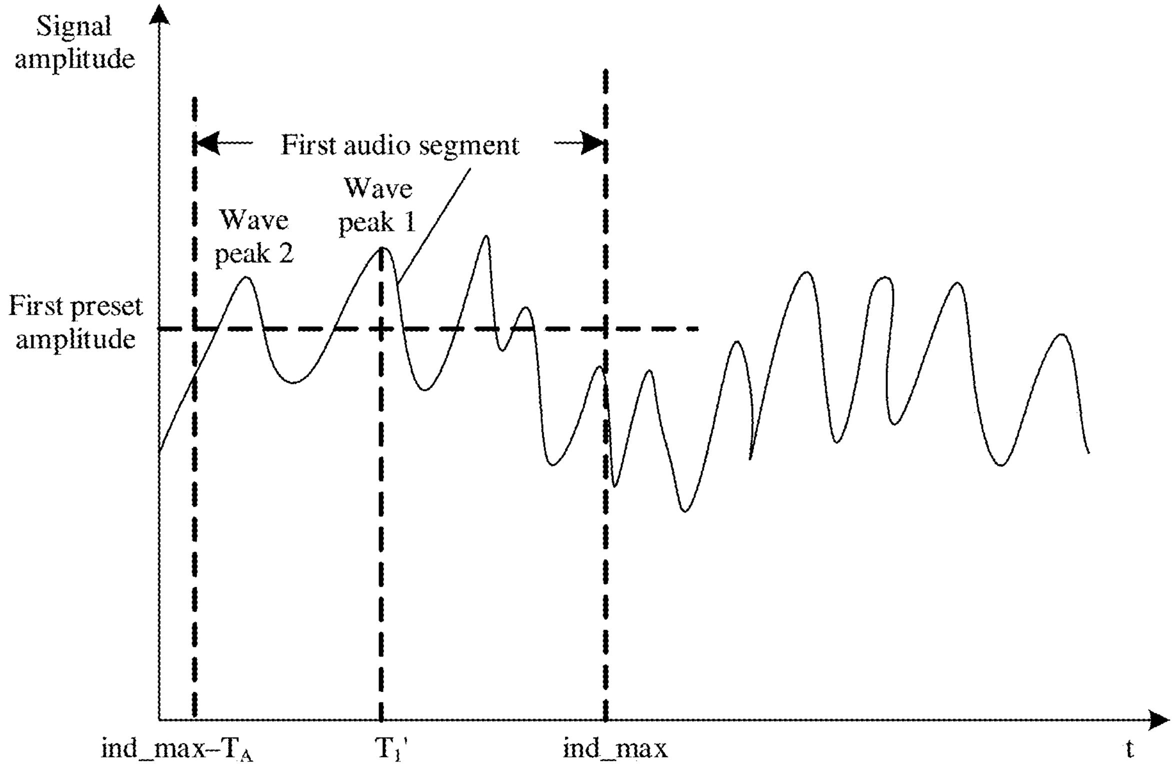
FIG. 9 is a schematic diagram of a principle of determining an arrival moment according to an embodiment of this application.

For example, the first audio segment is shown in FIG. 9, and a time range corresponding to the audio segment is [ind_max$-T_A$, ind_max]. In the first audio segment, a wave peak whose signal amplitude exceeds the first preset amplitude includes a wave peak 1 and a wave peak 2. Receiving time of the wave peak 2 is earlier than receiving time of the wave peak 1. Therefore, a moment $T_1'$ corresponding to the wave peak 2 is used as the first arrival moment.

The second arrival moment may be determined based on the second audio segment in the foregoing manner.

Optionally, the first preset amplitude is a1×target amplitude, the second preset amplitude is a2×target amplitude, and a1 and a2 are constants. Optionally, a1 and a2 may be equal or may not be equal.

S704: Determine the relative location between the device A and the device B based on the first arrival moment and the second arrival moment.

In a feasible embodiment, determining the relative location between the device A and the device B based on the first arrival moment and the second arrival moment includes:

A first hyperbolic function is built based on the first arrival moment and the second arrival moment; and the relative location between the device A and the device B is determined based on the first hyperbolic function and the distance between the first speaker and the second speaker.

The first hyperbolic function is built based on the first arrival moment, the second arrival moment, the first moment, and the second moment, and the relative location between the device A and the device B is determined based on the first hyperbolic function and the distance between the first speaker and the second speaker.

Optionally, the first moment may be a moment at which the first speaker generates the first audio signal, and the second moment may be a moment at which the second speaker generates the second audio signal. In this case, the first moment and the second moment are sent by the device A to the device B in a wireless manner, and the device A may further send the distance between the first speaker and the second speaker to the device B in this manner. The wireless manner includes manners such as Bluetooth and Wi-Fi. The first moment may be an estimated value of the moment at which the first speaker generates the first audio signal, and the second moment may be an estimated value of the moment at which the second speaker generates the second audio signal.

Figure 10:
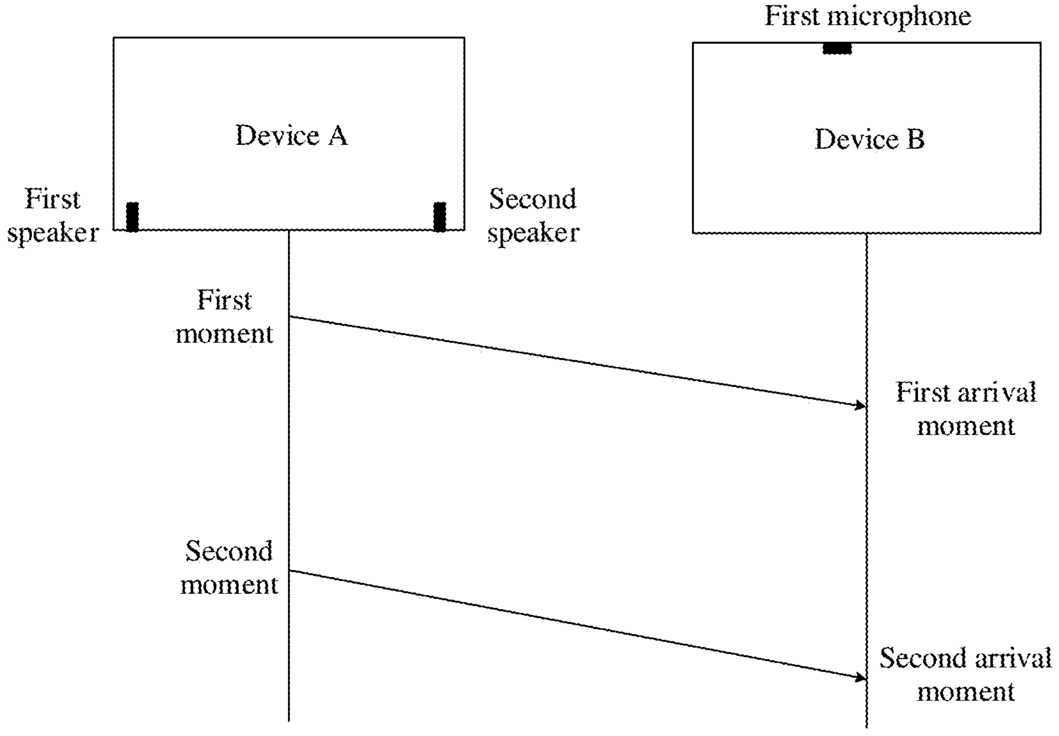
FIG. 10 is a schematic diagram of a sound emitting process according to an embodiment of this application.
Figure 11:
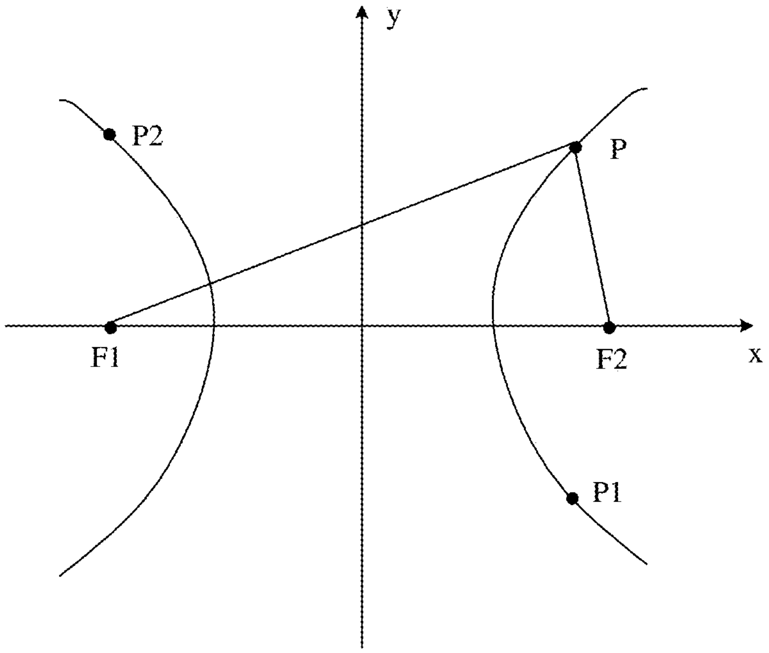
FIG. 11 is a schematic diagram of location relationships between a first hyperbola and a first speaker and between the first hyperbola and a second speaker.

As shown in FIG. 10, a sound emitting moment of the first speaker or an estimated value of the sound emitting moment of the first speaker is the foregoing first moment, and a sound emitting moment of the second speaker or an estimated value of the sound emitting moment of the second speaker is the foregoing second moment. Based on a principle of sound propagation, a difference between the first arrival moment and the first moment is proportional to a distance between the first speaker of the device A and the first microphone of the device B, and a difference between the second arrival moment and the second moment is proportional to a distance between the second speaker of the device A and the first microphone of the device B. Therefore, a first hyperbola is built based on that (second arrival moment-second moment)−(first arrival moment-first moment) is equal to a fixed value. As shown in FIG. 11, a point F1 and a point F2 respectively represent locations of the first speaker and the second speaker of the device A, F1 and F2 are also focuses of the first hyperbola, a point on the first hyperbola is a location of the first microphone of the device B, and the first hyperbola may be considered as a location track of the first microphone of the device B. When selecting a second microphone, a user generally selects, as the second microphone, a microphone that is on a same horizontal line or vertical line as the first microphone on the device B. In this case, the first microphone and the second microphone may be considered to be symmetrically distributed. Therefore, after a location of the first microphone is determined, a location of the second microphone may be determined based on a symmetry relationship, to determine the relative location between the device A and the device B. It is assumed that in a coordinate system in FIG. 11, the location of the first microphone of the device B is a point P in FIG. 11, and is symmetrical to the location of the second microphone along a y axis. In this case, the location of the second microphone of the device B is a point P1 in FIG. 11. It may be determined, based on location relationships between the point P1 and F1, between the point P1 and F2, between the point P and F1, and between the point P and F2, that the device B is located on the left of the device A. It is assumed that the location of the first microphone of the device B is a point P in FIG. 11, and is symmetrical to the location of the second microphone along an x axis. In this case, the location of the second microphone of the device B is a point P2 in FIG. 11. It may be determined, based on location relationships between the point P2 and F1, between the point P2 and F2, between the point P and F1, and between the point P and F2, that the device B is located behind the device A.

A location of the device B relative to the device A may be determined in the foregoing manner, but is limited to that the device B is located in front, rear, left, and right of the device A.

Optionally, it can only be determined, based on one microphone, that the device B is located in front, rear, left, and right of the device A, which results in low precision of such a result. To improve the precision, the second microphone of the device B is introduced, and a third arrival moment and a fourth arrival moment are determined in the foregoing manner. The third arrival moment and the fourth arrival moment are respectively a moment corresponding to a third target wave peak and a moment corresponding to a fourth target wave peak. The third target wave peak is a wave peak with earliest receiving time in wave peaks whose signal amplitudes are greater than a third preset amplitude in a fifth audio segment. The fourth target wave peak is a wave peak with earliest receiving time in wave peaks whose signal amplitudes are greater than a fourth preset amplitude in a sixth audio segment. The fifth audio segment is a segment that is in a second target audio signal and that is related to the first audio signal. The sixth audio segment is a segment that is in the second target audio signal and that is related to the second audio signal. The second target audio signal is obtained by a second microphone of the device B based on the first audio signal emitted by the first speaker of the device A and the second audio signal emitted by the second speaker of the device A. Determining the relative location between the device A and the device B based on the first arrival moment and the second arrival moment includes:

determining the relative location between the device A and the device B based on the first arrival moment, the second arrival moment, the third arrival moment, the fourth arrival moment, the distance between the first speaker and the second speaker, and a distance between the first microphone and the second microphone.

Specifically, the first hyperbola function is built based on the first arrival moment, the second arrival moment, the first moment, and the second moment. A second hyperbola function is built based on the third arrival moment, the fourth arrival moment, the first moment, and the second moment. In a same coordinate system, the relative location between the device A and the device B is determined based on a location relationship between a graph of the first hyperbola function and a graph of the second hyperbola function, the distance between the first speaker and the second speaker, and the distance between the first microphone and the second microphone of the device B.

It should be noted herein that a manner of determining the third arrival moment and the fourth arrival moment is the same as a manner of determining the first arrival moment and the second arrival moment, and details are not described herein again.

Figure 12:
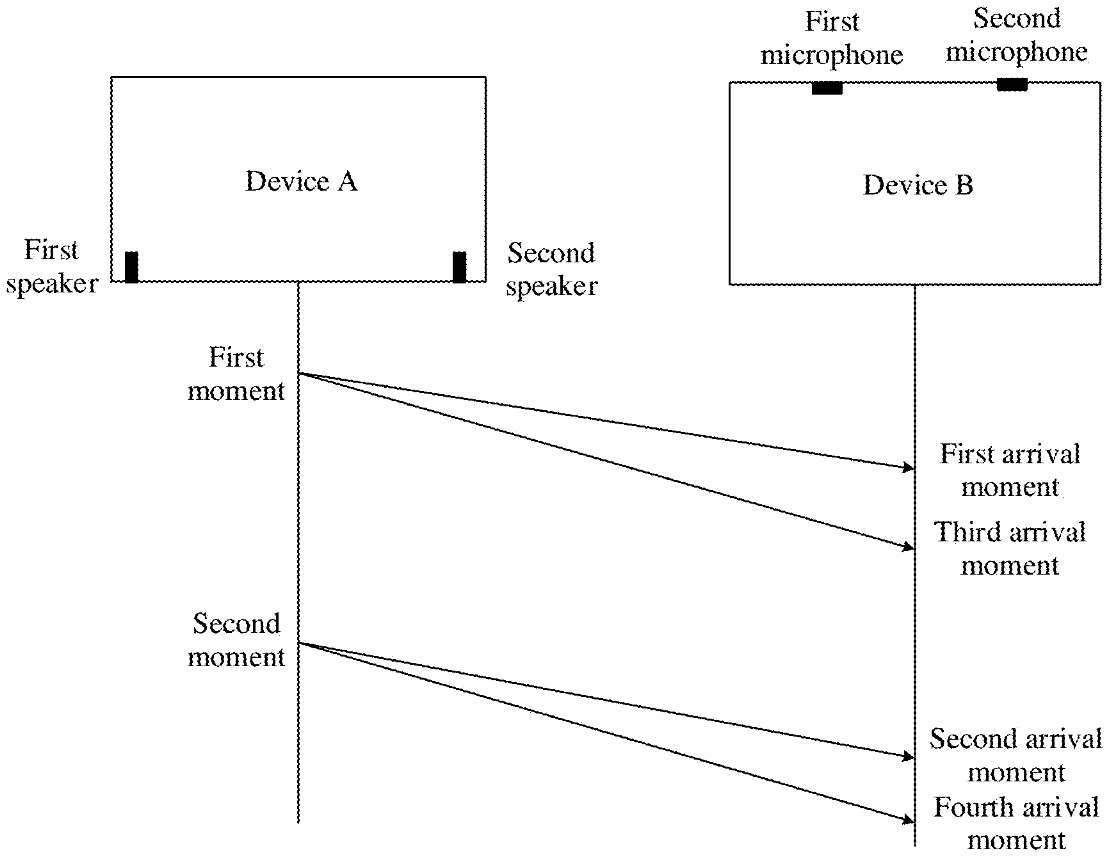
FIG. 12 is a schematic diagram of another sound emitting process according to an embodiment of this application.
Figure 13:
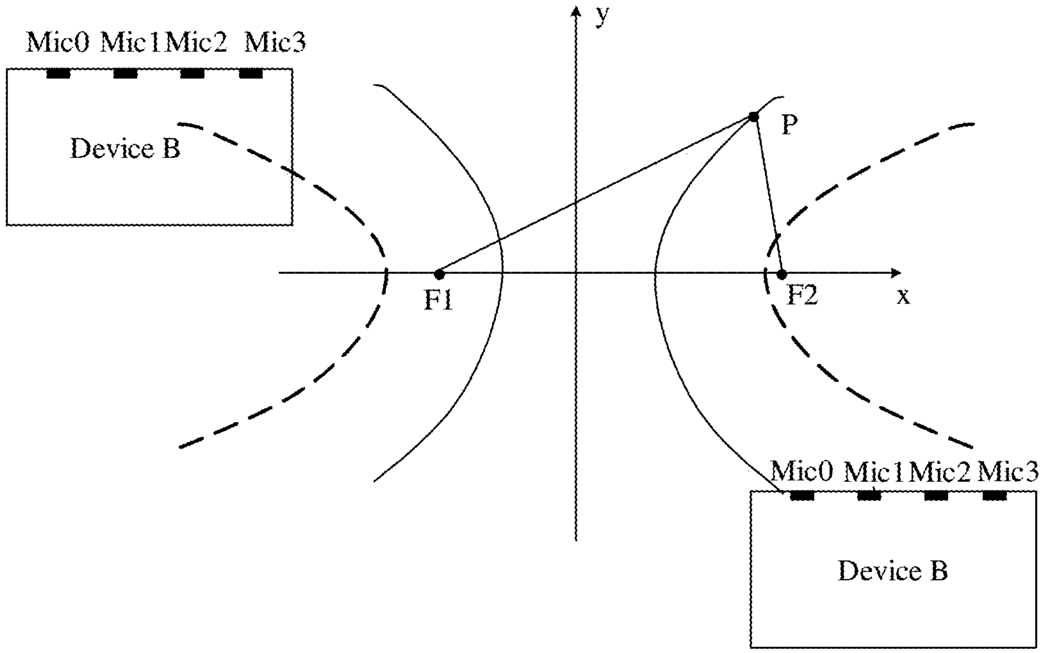
FIG. 13 is a schematic diagram of location relationships between a first hyperbola and a first speaker, between the first hyperbola and a second speaker, between a second hyperbola and the first speaker, and between the second hyperbola and the second speaker.

As shown in FIG. 12, a sound emitting moment of the first speaker or an estimated value of the sound emitting moment of the first speaker is the foregoing first moment, and a sound emitting moment of the second speaker or an estimated value of the sound emitting moment of the second speaker is the foregoing second moment. Based on a principle of sound propagation, a difference between the first arrival moment and the first moment is proportional to a distance between the first speaker of the device A and the first microphone of the device B, and a difference between the second arrival moment and the second moment is proportional to a distance between the second speaker of the device A and the first microphone of the device B, a difference between the third arrival moment and the first moment is proportional to a distance between the first speaker of the device A and the second microphone of the device B, and a difference between the fourth arrival moment and the second moment is proportional to a distance between the second speaker of the device A and the second microphone of the device B. Therefore, a first hyperbola is built based on that (second arrival moment−second moment)−(first arrival moment−first moment) is equal to a fixed value, as shown by a solid line in FIG. 13, and a second hyperbola is built based on that (fourth arrival moment−second moment)−(third arrival moment−first moment) is equal to another fixed value, as shown by a dashed line in FIG. 13. A point F1 and a point F2 on the first hyperbola and the second hyperbola respectively represent locations of the first speaker and the second speaker of the device A, the point F1 and the point F2 are focuses of the first hyperbola and the second hyperbola, and the first hyperbola and the second hyperbola may be respectively considered as location tracks of the first microphone and the second microphone of the device B. Two points that meet a relative location relationship between the first microphone and the second microphone are determined on the first hyperbola and the second hyperbola based on a relative location between the first microphone and the second microphone of the device B. As shown in FIG. 13, if the first microphone and the second microphone of the device B are respectively a mic0 and a mic3, parts that are of the first hyperbola and the second hyperbola and that are in a first quadrant and a fourth quadrant of the coordinate system can be determined based on a location relationship between the mic0 and the mic3, to find out two points that meet the location relationship between the mic0 and the mic3. When the two points that meet the location relationship between the mic0 and the mic3 are in the first quadrant of the foregoing coordinate system, the mic0 and the mic3 are blocked by the device B relative to the device A, which does not meet the foregoing microphone selection criterion. Therefore, the two points that meet the location relationship between the mic0 and the mic3 cannot be in the first quadrant of the foregoing coordinate system, and can only be in the fourth quadrant, and the location relationship between the device B and the device A is determined based on location relationships between the two points that are on the first hyperbola and the second hyperbola and that are in the fourth quadrant of the coordinate system and the point F1 and the point F2. The location relationship includes eight orientations: front, rear, left, right, rear left, front left, rear right, and front right. In this way, location information determined based on two microphones is more accurate than that determined based on one microphone.

Further, after the location of the device B relative to the device A is determined, a location of the device A relative to the device A may be determined based on the location.

Figure 8D:
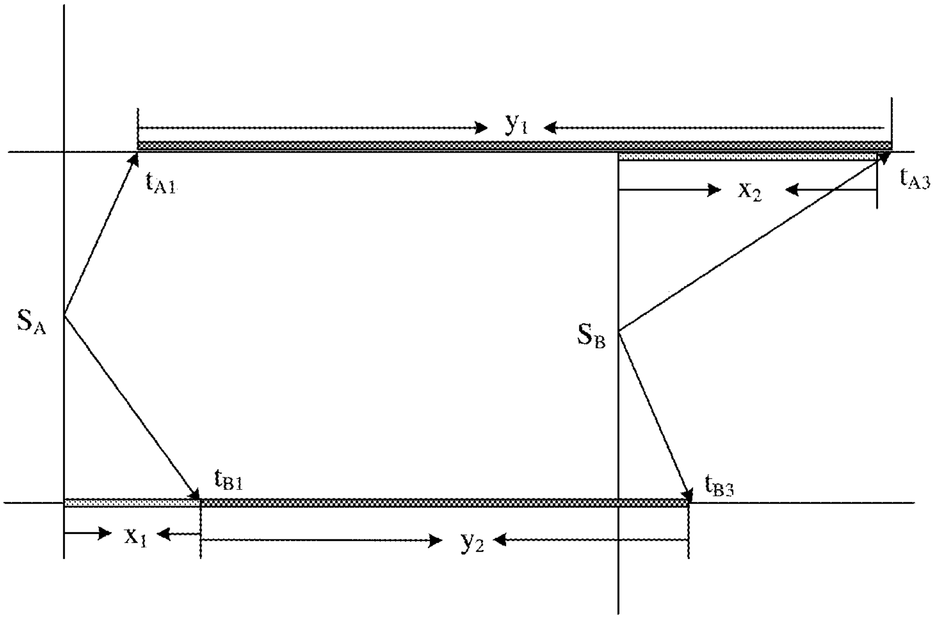
FIG. 8*d* is a schematic diagram of a principle of determining a difference between time of sound transmission.

It can be learned from the foregoing description that, when the hyperbola is built, the difference of (second arrival moment−second moment)−(first arrival moment−first moment) is used. In a feasible example, the difference may be obtained in the following manner:

As shown in FIG. 8*d*, a speaker $S_A$ of the device A sends an audio signal S1. After a time period $t_{A1}$, the audio signal S1 is received by a microphone of the device A. After a time period $t_{A3}$, the audio signal S1 is received by a microphone of the device B. A speaker $S_B$ of the device B sends an audio signal S2. After a time period $t_{B3}$, the audio signal S2 is received by a microphone of the device B. After a time period $t_{Bl}$, the audio signal S2 is received by a microphone of the device A. A round-trip distance between two devices is a sum of time periods indicated by two light gray blocks. It can be proved, based on a mathematical principle, that the round-trip distance is approximately equal to a difference between time periods indicated by two dark gray blocks, that is, (x1+x2)=(y1−y2). In this way, a difference between a time period within which a peer end emits a sound and a time period within which a local end receives the sound is converted into a sum of time periods within which the local end receives the sound twice.

It should be noted herein that for a moment at which a sound emitted by a speaker of one device is received by a microphone of another device, refer to a process of calculating the first arrival moment or the second arrival moment in this application. Details are not described herein again.

In a feasible embodiment, the device A is a projection device, and the device B is a projected device. After the relative location between the device A and the device B is determined based on the first arrival moment and the second arrival moment, the method in this application further includes:

Content displayed on a display interface of the device A is displayed in a preset area on a display interface of the device B. A location of the preset area that is of the device B and that is on the display interface of the device B is the same as the location of the device A relative to the device B.

Figure 14A:
FIG. 14*a* is a schematic diagram of an application scenario based on a relative location between devices.

An example in which the device A is a mobile phone and the device B is a laptop computer is used for description. As shown in FIG. 14*a*, the mobile phone is located on the right of the laptop computer, and content displayed on a display interface of the mobile phone is projected to a preset area on a display interface of the laptop computer. The preset area on the display interface of the laptop computer is located on the right of the display interface, and is the same as a location of the mobile phone relative to the laptop computer.

In the projection field, if a UWB technology is used, all devices need to have a UWB chip, which results in high costs. If a Bluetooth technology and a Wi-Fi technology are used, because a propagation speed of an electromagnetic wave is a speed of light, without a very good clock synchronization mechanism, precision of small-distance detection is insufficient, an orientation cannot be determined, and a projection direction can only be fixed. However, according to the method in this application, a relative location between devices can be implemented with low costs and high precision without additional hardware, to implement projection in any direction.

Figure 14B:
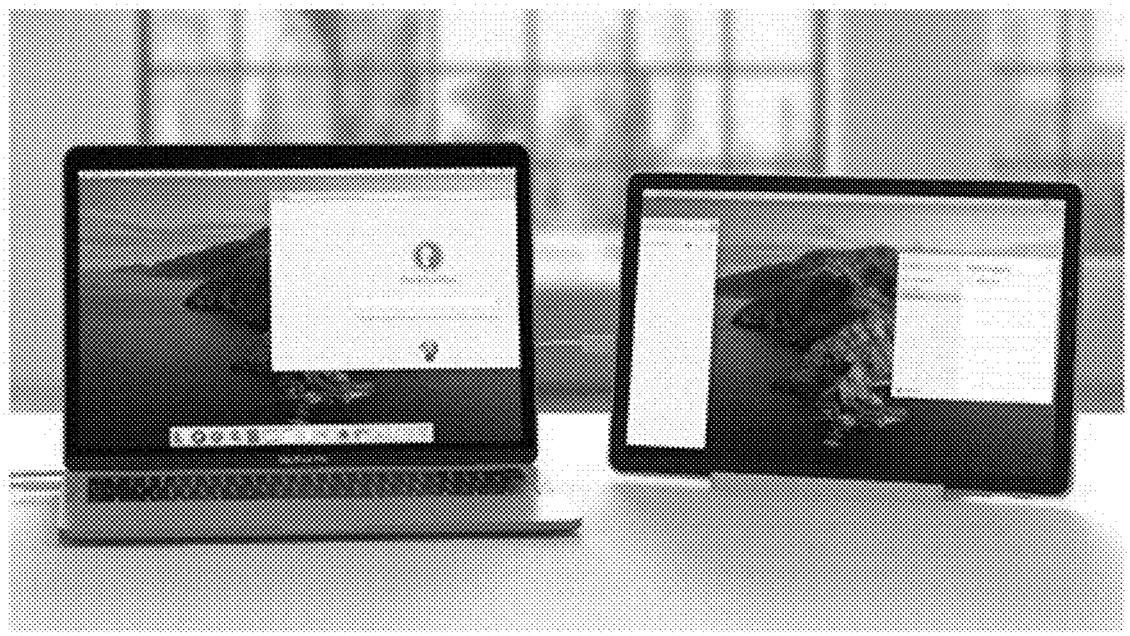
FIG. 14*b* is a schematic diagram of another application scenario based on a relative location between devices.

An example in which the device A is a pad and the device B is a laptop computer is used for description. As shown in FIG. 14*b*, the pad is on the left of the laptop computer. Based on a relative location between the pad and the laptop computer, a part of browser content displayed on a display interface of the pad is displayed on a display interface of the laptop computer, and is displayed on the left of the display interface of the laptop computer. The display interface of the laptop computer is used as an extended screen of the pad. In addition, a location, on the display interface of the laptop computer, of a display area that is used by the laptop computer to display a part of the browser displayed on the pad is the same as a location of the pad relative to the laptop computer.

It should be noted herein that application scenarios shown in FIG. 14*a* and FIG. 14*b* are merely specific examples, and are not intended to limit this application.

It can be learned that in the solutions of this application, the relative location between the device A and the device B is determined based on the audio signals that are sent by the first speaker and the second speaker of the device A and that are captured by the microphone of the device B, so that the relative location between the devices is determined without additional hardware. The relative location between the device A and the device B is determined based on the first arrival moment and the second arrival moment. This avoids multipath interference of the audio signals in a spatial transmission process, and further improves precision of the relative location between the devices. When the microphone of the device B is selected, a proper microphone is selected in the manner disclosed in this application, to receive the audio signals from the first speaker and the second speaker of the device A. This can reduce power consumption of the device A and the device B, and also improve precision of the relative location between the devices.

Figure 15:
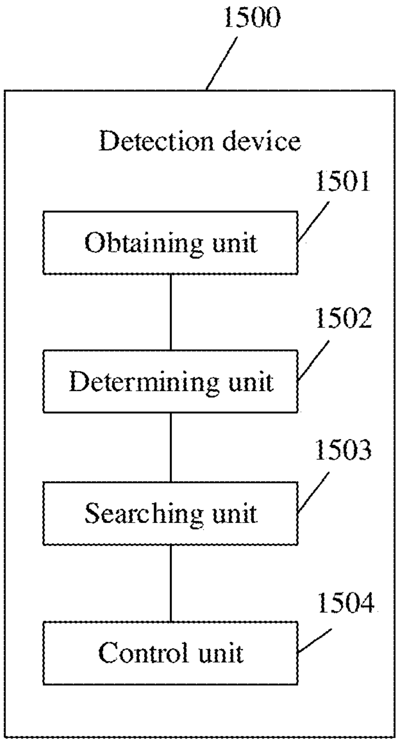
FIG. 15 is a schematic diagram of a structure of a detection device according to an embodiment of this application.

FIG. 15 is a schematic diagram of a structure of a detection device according to an embodiment of this application. As shown in FIG. 15, the detection device 1500 includes: an obtaining unit 1501, a determining unit 1502, and a searching unit 1503.

The obtaining unit 1501 is configured to obtain a first target audio signal by using a first microphone of a device B, where the first target audio signal is obtained based on a first audio signal emitted by a first speaker of a device A and a second audio signal emitted by a second speaker of the device A.

The determining unit 1502 is configured to determine a first audio segment and a second audio segment based on a first target moment and the first target audio signal, where the first target moment is a moment determined in the first target audio signal based on a target amplitude, the first audio segment is a segment that is in the first target audio signal and that is related to the first audio signal, the second audio segment is a segment that is in the first target audio signal and that is related to the second audio signal, and in the first target audio signal, a time range corresponding to the first audio segment does not overlap a time range corresponding to the second audio segment.

The searching unit 1503 is configured to separately search for the first audio segment and the second audio segment to obtain a first arrival moment and a second arrival moment, where the first arrival moment is a moment corresponding to a first target wave peak, the second arrival moment is a moment corresponding to a second target wave peak, the first target wave peak is a wave peak with earliest receiving time in wave peaks whose signal amplitudes are greater than a first preset amplitude in the first audio segment, and the second target wave peak is a wave peak with earliest receiving time in wave peaks whose signal amplitudes are greater than a second preset amplitude in the second audio segment.

The determining unit 1502 is further configured to determine a relative location between the device A and the device B based on the first arrival moment and the second arrival moment.

In a feasible embodiment, the determining unit 1502 is specifically configured to:

determine the first audio segment from the first target audio signal based on the first target moment, a distance between the first speaker and the second speaker of the device A, and a sampling frequency of the first microphone of the device B; and determine the second audio segment from the first target audio signal based on the first target moment, the distance between the first speaker and the second speaker of the device A, the sampling frequency of the first microphone of the device B, and a time interval between a moment at which the first speaker of the device A generates the first audio signal and a moment at which the second speaker of the device A generates the second audio signal.

In a feasible embodiment, in an aspect of determining the first audio segment from the first target audio signal based on the first target moment, the distance between the first speaker and the second speaker of the device A, and the sampling frequency of the first microphone of the device B, the determining unit 1502 is specifically configured to:

determine a first time range based on the first target moment, the distance between the first speaker and the second speaker of the device A, and the sampling frequency of the first microphone of the device B, where a start moment of the first time range is $ind\_max-2\times(d/v)\times f$, an end moment of the first time range is $ind\_max+2\times(D/v)\times f$, ind_max is the first target moment, d is a first preset distance, D is the distance between the first speaker and the second speaker of the device A, v is a sound velocity, and f is the sampling frequency of the first microphone of the device B; and determine the first audio segment from the first target audio signal based on the first time range, where the first audio segment is an audio segment corresponding to the first time range in the first target audio signal.

In a feasible embodiment, in an aspect of determining the second audio segment from the first target audio signal based on the first target moment, the distance between the first speaker and the second speaker, the sampling frequency of the first microphone, and the time interval between the moment at which the first speaker generates the first audio signal and the moment at which the second speaker generates the second audio signal, the determining unit 1502 is specifically configured to:

determine a second time range based on the first target moment, the distance between the first speaker and the second speaker, the sampling frequency of the first microphone, and the time interval, where a start moment of the second time range is $ind\_max-2\times(d/v)\times f-T_1$, an end moment of the second time range is $ind\_max+2\times(D/v)\times f-T_1$, ind_max is the first target moment, d is the first preset distance, D is the distance between the first speaker and the second speaker, v is the sound velocity, f is the sampling frequency of the first microphone of the device B, and $T_1$ is the time interval; and determine the second audio segment from the first target audio signal based on the second time range, where the second audio segment is an audio segment corresponding to the second time range in the second target audio signal.

In a feasible embodiment, in an aspect of determining the second audio segment from the first target audio signal based on the first target moment, the distance between the first speaker and the second speaker of the device A, the sampling frequency of the first microphone of the device B, and the time interval between the moment at which the first speaker of the device A generates the first audio signal and the moment at which the second speaker of the device A generates the second audio signal, the determining unit 1502 is specifically configured to:

determine a third time range and a fourth time range based on the first target moment, the distance between the first speaker and the second speaker of the device A, the sampling frequency of the first microphone of the device B, and the time interval between the moment at which the first speaker of the device A generates the first audio signal and the moment at which the second speaker of the device A generates the second audio signal, where a start moment of the third time range is $ind\_max-2\times(d/v)\times f+T_1$, an end moment of the third time range is $ind\_max+T_1+2\times(D/v)\times f$, a start moment of the fourth time range is $ind\_max-2\times(d/v)\times f-T_1$, an end moment of the fourth time range is $ind\_max-T_1+2\times(D/v)\times f$, ind_max is the first target moment, d is the first preset distance, D is the distance between the first speaker and the second speaker of the device A, v is the sound velocity, f is the sampling frequency of the first microphone of the device B, and $T_1$ is the time interval; and determine the second audio segment from a third audio segment and a fourth audio segment, where the second audio segment is an audio segment in which a ratio of a maximum signal amplitude to an LOS signal amplitude falls within a preset range in the third audio segment and the fourth audio segment, the third audio segment is an audio segment corresponding to the third time range in the first target audio signal, and the fourth audio segment is an audio segment corresponding to the fourth time range in the first target audio signal.

In a feasible embodiment, the first target audio signal includes a third audio signal and a fourth audio signal, the third audio signal is the first audio signal that is emitted by the first speaker of the device A and that is received by the first microphone of the device B, and the fourth audio signal is the second audio signal that is emitted by the second speaker of the device A and that is received by the first microphone of the device B. In an aspect of determining the first audio segment and the second audio segment based on the first target moment and the first target audio signal, the determining unit 1502 is specifically configured to:

determine a fifth time range based on the first target moment and a preset time threshold, and determine a sixth time range based on a second target moment and the preset time threshold, where the first target moment is a moment determined in the third audio signal based on the target amplitude, the second target moment is a moment determined in the fourth audio signal based on the target amplitude, an end moment of the fifth time range is the first target moment, an end moment of the sixth time range is the second target moment, and both duration of the fifth time range and duration of the sixth time range are the preset time threshold; and obtain the first audio segment from the third audio signal based on the fifth time range, and obtain the second audio segment from the fourth audio signal based on the sixth time range, where the first audio segment is an audio signal segment corresponding to the fifth time range in the third audio signal, and the second audio segment is an audio signal segment corresponding to the sixth time range in the fourth audio signal.

In a feasible embodiment, the preset time threshold is determined based on a preset distance and a time interval between a moment at which the first speaker of the device A generates an audio signal and a moment at which the second speaker of the device A generates an audio signal.

In a feasible embodiment, in an aspect of determining the relative location between the device A and the device B based on the first arrival moment and the second arrival moment, the determining unit 1502 is specifically configured to:

build a first hyperbolic function based on the first arrival moment and the second arrival moment; and determine the relative location between the device A and the device B based on the first hyperbolic function and the distance between the first speaker and the second speaker of the device A.

In a feasible embodiment, the obtaining unit 1501 is further configured to: obtain a third arrival moment and a fourth arrival moment, where the third arrival moment is a moment corresponding to a third target wave peak, the fourth arrival moment is a moment corresponding to a fourth target wave peak, the third target wave peak is a wave peak with earliest receiving time in wave peaks whose signal amplitudes are greater than a third preset amplitude in a fifth audio segment, the fourth target wave peak is a wave peak with earliest receiving time in wave peaks whose signal amplitudes are greater than a fourth preset amplitude in a sixth audio segment, the fifth audio segment is a segment that is in a second target audio signal and that is related to the first audio signal, the sixth audio segment is a segment that is in the second target audio signal and that is related to the second audio signal, and the second target audio signal is obtained by a second microphone of the device B based on the first audio signal emitted by the first speaker of the device A and the second audio signal emitted by the second speaker of the device A.

In an aspect of determining the relative location between the device A and the device B based on the first arrival moment and the second arrival moment, the determining unit 1502 is specifically configured to:

determine the relative location between the device A and the device B based on the first arrival moment, the second arrival moment, the third arrival moment, the fourth arrival moment, the distance between the first speaker and the second speaker of the device A, and a distance between the first microphone and the second microphone.

In a feasible embodiment, the first microphone of the device B is:

a microphone that is in a plurality of microphones of the device B and that has a maximum difference between a distance from the first speaker and a distance from the second speaker, where the difference is greater than a preset distance; or a microphone that is in a plurality of microphones of the device B and that is least blocked by the device B relative to the first speaker and the second speaker.

In a feasible embodiment, the first microphone and the second microphone of the device B include:

two microphones that are farthest from each other in a plurality of microphones of the device B; two microphones that are in a plurality of microphones of the device B and that each has a difference, greater than the preset distance, between a distance from the first speaker and a distance from the second speaker; or two microphones that are in a plurality of microphones of the device B and that are least blocked by the device B relative to the first speaker and the second speaker of the device A.

In a feasible embodiment, the device A is a projection device, the device B is a projected device, and the detection apparatus further includes:

a control unit 1504, configured to: after the relative location between the device A and the device B is determined based on the first arrival moment and the second arrival moment, display, in a preset area on a display interface of the device B, content displayed on a display interface of the device A, where a location of the preset area on the display interface of the device B is the same as a location of the device A relative to the device B.

It should be noted that the foregoing units (the obtaining unit 1501, the determining unit 1502, the searching unit 1503, and the control unit 1504) are configured to perform related steps of the foregoing method. For example, the obtaining unit 1501 is configured to perform related content in S701, the determining unit 1502, the obtaining unit 1501, and the control unit 1504 are configured to perform related content in S702 and S704, and the searching unit 1503 is configured to perform related content in S703.

In this embodiment, the detection device 1500 is presented in a form of a unit. The "unit" herein may be an application-specific integrated circuit (application-specific integrated circuit, ASIC), a processor and a memory that execute one or more software or firmware programs, an integrated logic circuit, and/or another component that can provide the foregoing functions. In addition, the obtaining unit 1501, the determining unit 1502, the searching unit 1503, and the control unit 1504 may be implemented by using a processor **16*oi* of a detection apparatus shown in FIG. 16**.

Figure 16:
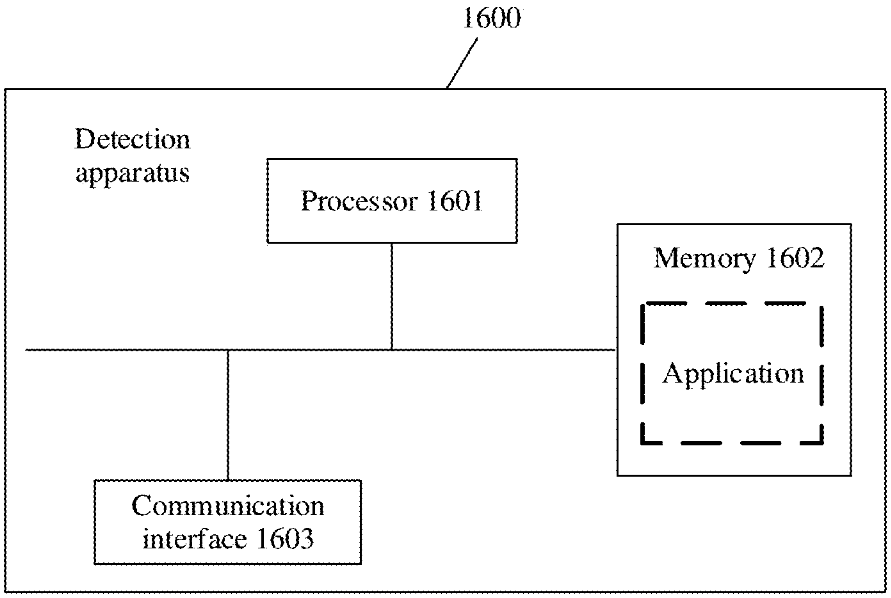
FIG. 16 is a schematic diagram of a structure of a detection apparatus according to an embodiment of this application.

The detection apparatus 1600 shown in FIG. 16 may be implemented by using a structure in FIG. 16. The detection apparatus 1600 includes at least one processor 1601, at least one memory 1602, and at least one communication interface 1603. The processor 1601, the memory 1602, and the communication interface 1603 are connected and communicate with each other through a communication bus.

The processor 1601 may be a general-purpose central processing unit (CPU), a microprocessor, an application-specific integrated circuit (application-specific integrated circuit, ASIC), or one or more integrated circuits configured to control program execution of the foregoing solution.

The communication interface 1603 is configured to communicate with another device or a communication network, such as the ethernet, a radio access network (RAN), or a wireless local area network (Wireless Local Area Network, WLAN).

The memory 1602 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be accessed by a computer and that can be configured to carry or store expected program code in an instruction form or in a data structure form, but is not limited thereto. The memory may exist independently, and is connected to the processor through a bus. The memory may alternatively be integrated with the processor.

The memory 1602 is configured to store application program code for executing the foregoing solution, and the processor 1601 controls the execution. The processor 1601 is configured to execute the application program code stored in the memory 1602.

The code stored in the memory 1602 may perform any one of the foregoing methods for detecting a relative location between devices. When the processor 1601 executes the code stored in the memory 1602, the processor 1601 performs the following method:

obtaining a first target audio signal obtained by a first microphone of a device B, where the first target audio signal is obtained based on a first audio signal emitted by a first speaker of a device A and a second audio signal emitted by a second speaker of the device A; determining a first audio segment and a second audio segment based on a first target moment and the first target audio signal, where the first target moment is a moment determined in the first target audio signal based on a target amplitude, the first audio segment is a segment that is in the first target audio signal and that is related to the first audio signal, the second audio segment is a segment that is in the first target audio signal and that is related to the second audio signal, and in the first target audio signal, a time range corresponding to the first audio segment does not overlap a time range corresponding to the second audio segment; separately searching for the first audio segment and the second audio segment to obtain a first arrival moment and a second arrival moment, where the first arrival moment is a moment corresponding to a first target wave peak, the second arrival moment is a moment corresponding to a second target wave peak, the first target wave peak is a wave peak with earliest receiving time in wave peaks whose signal amplitudes are greater than a first preset amplitude in the first audio segment, and the second target wave peak is a wave peak with earliest receiving time in wave peaks whose signal amplitudes are greater than a second preset amplitude in the second audio segment; and determining a relative location between the device A and the device B based on the first arrival moment and the second arrival moment.

In a feasible embodiment, in an aspect of determining the first audio segment and the second audio segment based on the first target moment and the first target audio signal, the processor 1601 is specifically configured to:

determine the first audio segment from the first target audio signal based on the first target moment, a distance between the first speaker and the second speaker of the device A, and a sampling frequency of the first microphone of the device B; and determine the second audio segment from the first target audio signal based on the first target moment, the distance between the first speaker and the second speaker of the device A, the sampling frequency of the first microphone of the device B, and a time interval between a moment at which the first speaker of the device A generates the first audio signal and a moment at which the second speaker of the device A generates the second audio signal.

In a feasible embodiment, in an aspect of determining the first audio segment from the first target audio signal based on the first target moment, the distance between the first speaker and the second speaker of the device A, and the sampling frequency of the first microphone of the device B, the processor 1601 is specifically configured to:

determine a first time range based on the first target moment, the distance between the first speaker and the second speaker of the device A, and the sampling frequency of the first microphone of the device B, where a start moment of the first time range is $ind\_max-2\times(d/v)\times f$, an end moment of the first time range is $ind\_max+2\times(D/v)\times f$, ind_max is the first target moment, d is a first preset distance, D is the distance between the first speaker and the second speaker of the device A, v is a sound velocity, and f is the sampling frequency of the first microphone of the device B; and determine the first audio segment from the first target audio signal based on the first time range, where the first audio segment is an audio segment corresponding to the first time range in the first target audio signal.

In a feasible embodiment, in an aspect of determining the second audio segment from the first target audio signal based on the first target moment, the distance between the first speaker and the second speaker, the sampling frequency of the first microphone, and the time interval between the moment at which the first speaker generates the first audio signal and the moment at which the second speaker generates the second audio signal, the processor 1601 is specifically configured to:

determine a second time range based on the first target moment, the distance between the first speaker and the second speaker, the sampling frequency of the first microphone, and the time interval, where a start moment of the second time range is $ind\_max-2\times(d/v)\times f-T_1$, an end moment of the second time range is $ind\_max+2\times(D/v)\times f-T_1$, ind_max is the first target moment, d is the first preset distance, D is the distance between the first speaker and the second speaker, v is the sound velocity, f is the sampling frequency of the first microphone, and $T_1$ is the time interval; and determine the second audio segment from the first target audio signal based on the second time range, where the second audio segment is an audio segment corresponding to the second time range in the second target audio signal.

In a feasible embodiment, in an aspect of determining the second audio segment from the first target audio signal based on the first target moment, the distance between the first speaker and the second speaker of the device A, the sampling frequency of the first microphone of the device B, and the time interval between the moment at which the first speaker of the device A generates the first audio signal and the moment at which the second speaker of the device A generates the second audio signal, the processor 1601 is specifically configured to:

determine a third time range and a fourth time range based on the first target moment, the distance between the first speaker and the second speaker of the device A, the sampling frequency of the first microphone of the device B, and the time interval, where a start moment of the third time range is ind_max−2×(d/v)×f+$T_1$, an end moment of the third time range is ind_max+$T_1$+2×(D/v)×f, a start moment of the fourth time range is ind_max−2×(d/v)×f−$T_1$, an end moment of the fourth time range is ind_max−$T_1$+2×(D/v)×f, ind_max is the first target moment, d is the first preset distance, D is the distance between the first speaker and the second speaker of the device A, v is the sound velocity, f is the sampling frequency of the first microphone of the device B, and $T_1$ is the time interval; and determine the second audio segment from a third audio segment and a fourth audio segment, where the second audio segment is an audio segment in which a ratio of a maximum signal amplitude to an LOS signal amplitude falls within a preset range in the third audio segment and the fourth audio segment, the third audio segment is an audio segment corresponding to the third time range in the first target audio signal, and the fourth audio segment is an audio segment corresponding to the fourth time range in the first target audio signal.

In a feasible embodiment, the first target audio signal includes a third audio signal and a fourth audio signal, the third audio signal is the first audio signal that is emitted by the first speaker of the device A and that is received by the first speaker of the device B, and the fourth audio signal is the second audio signal that is emitted by the second speaker of the device A and that is received by the first microphone of the device B. In an aspect of determining the first audio segment and the second audio segment based on the first target moment and the first target audio signal, the processor 1601 is specifically configured to:

determine a fifth time range based on the first target moment and a preset time threshold, and determine a sixth time range based on a second target moment and the preset time threshold, where the first target moment is a moment determined in the third audio signal based on the target amplitude, the second target moment is a moment determined in the fourth audio signal based on the target amplitude, an end moment of the fifth time range is the first target moment, an end moment of the sixth time range is a sixth target moment, and both duration of the fifth time range and duration of the sixth time range are the preset time threshold; and obtain the first audio segment from the third audio signal based on the fifth time range, and obtain the second audio segment from the fourth audio signal based on the sixth time range, where the first audio segment is an audio signal segment corresponding to the fifth time range in the third audio signal, and the second audio segment is an audio signal segment corresponding to the sixth time range in the fourth audio signal.

In a feasible embodiment, the preset time threshold is determined based on a preset distance and a time interval between a moment at which the first speaker of the device A generates the first audio signal and a moment at which the second speaker of the device A generates the second audio signal.

In a feasible embodiment, in an aspect of determining the relative location between the device A and the device B based on the first arrival moment and the second arrival moment, the processor 1601 is specifically configured to:

build a first hyperbolic function based on the first arrival moment and the second arrival moment; and determine the relative location between the device A and the device B based on the first hyperbolic function and the distance between the first speaker and the second speaker.

In a feasible embodiment, the processor 1601 is further specifically configured to:

obtain a third arrival moment and a fourth arrival moment, where the third arrival moment and the fourth arrival moment are respectively a moment corresponding to a third target wave peak and a moment corresponding to a fourth target wave peak, the third target wave peak is a wave peak with earliest receiving time in wave peaks whose signal amplitudes are greater than a third preset amplitude in a fifth audio segment, the fourth target wave peak is a wave peak with earliest receiving time in wave peaks whose signal amplitudes are greater than a fourth preset amplitude in a sixth audio segment, the fifth audio segment is a segment that is in a second target audio signal and that is related to the first audio signal, the sixth audio segment is a segment that is in the second target audio signal and that is related to the second audio signal, and the second target audio signal is obtained by a second microphone of the device B based on the first audio signal emitted by the first speaker of the device A and the second audio signal emitted by the second microphone of the device A.

In an aspect of determining the relative location between the device A and the device B based on the first arrival moment and the second arrival moment, the processor 1601 is specifically configured to:

determine the relative location between the device A and the device B based on the first arrival moment, the second arrival moment, the third arrival moment, the fourth arrival moment, the distance between the first speaker and the second speaker, and a distance between the first microphone and the second microphone.

In a feasible embodiment, the first microphone of the device B is:

a microphone that is in a plurality of microphones of the device B and that has a maximum difference between a distance from the first speaker and a distance from the second speaker, where the difference is greater than a preset distance; or a microphone that is in a plurality of microphones of the device B and that is least blocked by the device B relative to the first speaker and the second speaker.

In a feasible embodiment, the first microphone and the second microphone of the device B include:

two microphones that are farthest from each other in a plurality of microphones of the device B; two microphones that are in a plurality of microphones of the device B and that each has a difference, greater than the preset distance, between a distance from the first speaker and a distance from the second speaker; or two microphones that are in a plurality of microphones of the device B and that are least blocked by the device B relative to the first speaker and the second speaker of the device A.

In a feasible embodiment, the device A is a projection device, the device B is a projected device, and the processor **16*oi*** further configured to:

after the relative location between the device A and the device B is determined based on the first arrival moment and the second arrival moment, display, in a preset area on a display interface of the device B, content displayed on a display interface of the device A, where a location of the preset area on the display interface of the device B is the same as a location of the device A relative to the device B.

An embodiment of the present invention further provides a computer storage medium. The computer storage medium may store a program. When the program is executed, some or all of the steps of any method for detecting a relative location between devices in the foregoing method embodiments may be performed.

It should be noted that, for ease of description, the foregoing method embodiments are expressed as combinations of a series of actions. However, a person skilled in the art should know that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division, and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of embodiments.

In addition, functional units in embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the conventional technology, or all or some of the technical solutions may be implemented in a form of a software product. The computer software product is stored in a memory and includes several instructions for instructing a computer device (which may be a personal computer, a server, a network device, or the like) to perform all or some of the steps of the methods described in embodiments of the present invention. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include: a flash memory, a ROM, a RAM, a magnetic disk, or an optical disc.

Embodiments of the present invention are described in detail above. The principle and implementation of the present invention are described herein through specific examples. The description about embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of the specification shall not be construed as a limit to the present invention.

What is claimed is:

1. A method, comprising:

obtaining a first target audio signal obtained by a first microphone of a second device, wherein the first target audio signal is obtained based on a first audio signal emitted by a first speaker of a first device and a second audio signal emitted by a second speaker of the first device;

determining a first audio segment and a second audio segment based on a first target moment and the first target audio signal, wherein the first target moment is determined in the first target audio signal based on a target amplitude, the first audio segment is in the first target audio signal and is related to the first audio signal, the second audio segment is in the first target audio signal and is related to the second audio signal, and in the first target audio signal, a time range corresponding to the first audio segment does not overlap a time range corresponding to the second audio segment;

separately searching for the first audio segment and the second audio segment, to obtain a first arrival moment and a second arrival moment, wherein the first arrival moment corresponds to a first target wave peak, the second arrival moment corresponds to a second target wave peak, the first target wave peak has an earliest receiving time in wave peaks whose signal amplitudes are greater than a first preset amplitude in the first audio segment, and the second target wave peak has an earliest receiving time in wave peaks whose signal amplitudes are greater than a second preset amplitude in the second audio segment; and determining a relative location between the first device and the second device based on the first arrival moment and the second arrival moment;

wherein determining the first audio segment and the second audio segment based on the first target moment and the first target audio signal comprises:

determining the first audio segment from the first target audio signal based on the first target moment, a distance between the first speaker and the second speaker, and a sampling frequency of the first microphone; and determining the second audio segment from the first target audio signal based on the first target moment, the distance between the first speaker and the second speaker, the sampling frequency of the first microphone, and a time interval between a moment at which the first speaker generates the first audio signal and a moment at which the second speaker generates the second audio signal; and wherein determining the first audio segment from the first target audio signal based on the first target moment, the distance between the first speaker and the second speaker, and the sampling frequency of the first microphone comprises:

determining a first time range based on the first target moment, the distance between the first speaker and the second speaker, and the sampling frequency of the first microphone, wherein a start moment of the first time range is ind max−2×(d/v)×f, an end moment of the first time range is ind max+2×(D/v)×f, ind max is the first target moment, d is a first preset distance, D is the distance between the first speaker and the second speaker, v is a sound velocity, and f is the sampling frequency of the first microphone; and determining the first audio segment from the first target audio signal based on the first time range.

2. The method according to claim 1, wherein determining the relative location between the first device and the second device based on the first arrival moment and the second arrival moment comprises:

building a first hyperbolic function based on the first arrival moment and the second arrival moment; and determining the relative location between the first device and the second device based on the first hyperbolic function and the distance between the first speaker and the second speaker.

3. The method according to claim 1, further comprising:

obtaining a third arrival moment and a fourth arrival moment, wherein the third arrival moment corresponds to a third target wave peak, the fourth arrival moment corresponds to a fourth target wave peak, the third target wave peak has an earliest receiving time in wave peaks whose signal amplitudes are greater than a third preset amplitude in a fifth audio segment, the fourth target wave peak has an earliest receiving time in wave peaks whose signal amplitudes are greater than a fourth preset amplitude in a sixth audio segment, the fifth audio segment is in a second target audio signal and is related to the first audio signal, the sixth audio segment is in the second target audio signal and is related to the second audio signal, and the second target audio signal is obtained by a second microphone of the second device based on the first audio signal emitted by the first speaker and the second audio signal emitted by the second speaker; and wherein determining the relative location between the first device and the second device based on the first arrival moment and the second arrival moment comprises:

determining the relative location between the first device and the second device based on the first arrival moment, the second arrival moment, the third arrival moment, the fourth arrival moment, the distance between the first speaker and the second speaker, and a distance between the first microphone and the second microphone.

4. The method according to claim 1, wherein the first microphone of the second device is comprised in a plurality of microphones of the second device; and the first microphone has a maximum difference between a distance from the first speaker and a distance from the second speaker, wherein the maximum difference is greater than a preset distance; or the first microphone is least blocked by the second device relative to the first speaker and the second speaker.

5. The method according to claim 3, wherein the first microphone and the second microphone of the second device comprise:

two microphones that are farthest from each other in a plurality of microphones of the second device.

6. The method according to claim 1, wherein the first device is a projection device, the second device is a projected device, and after determining the relative location between the first device and the second device based on the first arrival moment and the second arrival moment, the method further comprises:

displaying, in a preset area on a display interface of the second device, content displayed on a display interface of the first device, wherein a location of the preset area on the display interface of the second device is the same as a location of the first device relative to the second device.

7. An apparatus, comprising:

a memory storing instructions that are executable by at least one processor; and the at least one processor coupled to the memory, wherein when the at least one processor executes the instructions, the apparatus performs operations comprising:

obtaining a first target audio signal obtained by a first microphone of a second device, wherein the first target audio signal is obtained based on a first audio signal emitted by a first speaker of a first device and a second audio signal emitted by a second speaker of the first device;

determining a first audio segment and a second audio segment based on a first target moment and the first target audio signal, wherein the first target moment is determined in the first target audio signal based on a target amplitude, the first audio segment is a segment that is in the first target audio signal and is related to the first audio signal, the second audio segment is in the first target audio signal and is related to the second audio signal, and in the first target audio signal, a time range corresponding to the first audio segment does not overlap a time range corresponding to the second audio segment; and separately searching for the first audio segment and the second audio segment to obtain a first arrival moment and a second arrival moment, wherein the first arrival moment corresponds to a first target wave peak, the second arrival moment corresponds to a second target wave peak, the first target wave peak has earliest receiving time in wave peaks whose signal amplitudes are greater than a first preset amplitude in the first audio segment, and the second target wave peak has earliest receiving time in wave peaks whose signal amplitudes are greater than a second preset amplitude in the second audio segment; and determining a relative location between the first device and the second device based on the first arrival moment and the second arrival moment;

wherein determining the first audio segment and the second audio segment based on the first target moment and the first target audio signal comprises:

determining the first audio segment from the first target audio signal based on the first target moment, a distance between the first speaker and the second speaker, and a sampling frequency of the first microphone; and determining the second audio segment from the first target audio signal based on the first target moment, the distance between the first speaker and the second speaker, the sampling frequency of the first microphone, and a time interval between a moment at which the first speaker generates the first audio signal and a moment at which the second speaker generates the second audio signal;

wherein determining the first audio segment from the first target audio signal based on the first target moment, the distance between the first speaker and the second speaker, and the sampling frequency of the first microphone, comprises:

determining a first time range based on the first target moment, the distance between the first speaker and the second speaker of the first device, and the sampling frequency of the first microphone of the second device, wherein a start moment of the first time range is $ind\ max-2\times(d/v)\times f$, an end moment of the first time range is $ind\ max+2\times(D/v)\times f$, ind max is the first target moment, d is a first preset distance, D is the distance between the first speaker and the second speaker, v is a sound velocity, and f is the sampling frequency of the first microphone; and determining the first audio segment from the first target audio signal based on the first time range.

8. The apparatus according to claim 7, wherein the first microphone of the second device is comprised in a plurality of microphones of the second device; and the first microphone has a maximum difference between a distance from the first speaker and a distance from the second speaker, wherein the maximum difference is greater than a preset distance.

9. The apparatus according to claim 7, wherein the first microphone and a second microphone of the second device comprise:

two microphones that are farthest from each other in a plurality of microphones of the second device.

10. The apparatus according to claim 7, wherein the first device is a projection device, the second device is a projected device, and wherein when the at least one processor executes the instructions, the apparatus performs operations comprising:

after the relative location between the first device and the second device is determined based on the first arrival moment and the second arrival moment, displaying, in a preset area on a display interface of the second device, content displayed on a display interface of the first device, wherein a location of the preset area on the display interface of the second device is the same as a location of the first device relative to the second device.

11. An apparatus, comprising:

a memory storing instructions that are executable by at least one processor; and the at least one processor coupled to the memory, wherein when the at least one processor executes the instructions, the apparatus performs operations comprising:

obtaining a first target audio signal obtained by a first microphone of a second device, wherein the first target audio signal is obtained based on a first audio signal emitted by a first speaker of a first device and a second audio signal emitted by a second speaker of the first device;

determining a first audio segment and a second audio segment based on a first target moment and the first target audio signal, wherein the first target moment is determined in the first target audio signal based on a target amplitude, the first audio segment is in the first target audio signal and is related to the first audio signal, the second audio segment is in the first target audio signal and is related to the second audio signal, and in the first target audio signal, a time range corresponding to the first audio segment does not overlap a time range corresponding to the second audio segment;

separately searching for the first audio segment and the second audio segment to obtain a first arrival moment and a second arrival moment, wherein the first arrival moment corresponds to a first target wave peak, the second arrival moment corresponds to a second target wave peak, the first target wave peak has an earliest receiving time in wave peaks whose signal amplitudes are greater than a first preset amplitude in the first audio segment, and the second target wave peak has an earliest receiving time in wave peaks whose signal amplitudes are greater than a second preset amplitude in the second audio segment; and determining a relative location between the first device and the second device based on the first arrival moment and the second arrival moment;

wherein determining the first audio segment and the second audio segment based on the first target moment and the first target audio signal comprises:

determining the first audio segment from the first target audio signal based on the first target moment, a distance between the first speaker and the second speaker, and a sampling frequency of the first microphone; and determining the second audio segment from the first target audio signal based on the first target moment, the distance between the first speaker and the second speaker, the sampling frequency of the first microphone, and a time interval between a moment at which the first speaker generates the first audio signal and a moment at which the second speaker generates the second audio signal;

wherein determining the second audio segment from the first target audio signal based on the first target moment, the distance between the first speaker and the second speaker, the sampling frequency of the first microphone, and the time interval between the moment at which the first speaker generates the first audio signal and the moment at which the second speaker generates the second audio signal comprises:

determining a second time range based on the first target moment, the distance between the first speaker and the second speaker, the sampling frequency of the first microphone, and the time interval, wherein a start moment of the second time range is $ind\_max-2\times(d/v)\times f-T_1$, an end moment of the second time range is $ind\_max+2\times(D/v)\times f-T_1$, ind_max is the first target moment, d is a first preset distance, D is the distance between the first speaker and the second speaker, v is a sound velocity, f is a sampling frequency of the first microphone, and $T_1$ is the time interval; and determining the second audio segment from the first target audio signal based on the second time range.

12. The apparatus according to claim 11, wherein the first microphone of the second device is comprised in a plurality of microphones of the second device; and the first microphone has a maximum difference between a distance from the first speaker and a distance from the second speaker, wherein the maximum difference is greater than a preset distance; or the first microphone is least blocked by the second device relative to the first speaker and the second speaker.

13. The apparatus according to claim 12, wherein the first microphone and a second microphone of the second device comprise:

two microphones that are farthest from each other in a plurality of microphones of the second device;

two microphones that are in a plurality of microphones of the second device and that each has a difference, greater than a preset distance, between a distance from the first speaker and a distance from the second speaker; or two microphones that are in a plurality of microphones of the second device and that are least blocked by the second device relative to the first speaker and the second speaker.

14. The apparatus according to claim 11, wherein the first device is a projection device, the second device is a projected device, and wherein when the at least one processor executes the instructions, the apparatus performs operations comprising:

after the relative location between the first device and the second device is determined based on the first arrival moment and the second arrival moment, displaying, in a preset area on a display interface of the second device, content displayed on a display interface of the first device, wherein a location of the preset area on the display interface of the second device is the same as a location of the first device relative to the second device.

15. The method according to claim 3, wherein the first microphone and the second microphone of the second device comprise:

two microphones that are in a plurality of microphones of the second device and that each has a difference, greater than a preset distance, between a distance from the first speaker and a distance from the second speaker.

16. The method according to claim 3, wherein the first microphone and the second microphone of the second device comprise:

two microphones that are in a plurality of microphones of the second device and that are least blocked by the second device relative to the first speaker and the second speaker.

17. The apparatus according to claim 7, wherein the first microphone of the second device is comprised in a plurality of microphones of the second device; and the first microphone is least blocked by the second device relative to the first speaker and the second speaker.

18. The apparatus according to claim 7, wherein the first microphone and a second microphone of the second device comprise:

two microphones that are in a plurality of microphones of the second device and that each has a difference, greater than a preset distance, between a distance from the first speaker and a distance from the second speaker.

19. The apparatus according to claim 7, wherein the first microphone and a second microphone of the second device comprise:

two microphones that are in a plurality of microphones of the second device and that are least blocked by the second device relative to the first speaker and the second speaker.

* * * * *